United States Patent [19]

Alvarado et al.

[11] Patent Number: 5,864,772

[45] Date of Patent: Jan. 26, 1999

[54] APPARATUS, SYSTEM AND METHOD TO TRANSMIT AND DISPLAY ACQUIRED WELL DATA IN NEAR REAL TIME AT A REMOTE LOCATION

[75] Inventors: Juan C. Alvarado, Cedar Park; Danielle S. P. Craievich, Austin; J. Thomas Provost, Round Rock, all of Tex.

[73] Assignee: Schlumberger Technology Corporation, Tex.

[21] Appl. No.: 772,956

[22] Filed: Dec. 23, 1996

[51] Int. Cl.$^6$ ...................................................... G06F 19/00
[52] U.S. Cl. .................................................. 702/9; 702/16
[58] Field of Search ................................ 702/6, 7, 9, 16; 367/71, 72

[56] References Cited

U.S. PATENT DOCUMENTS

| | | |
|---|---|---|
| 4,686,625 | 8/1987 | Bryan . |
| 4,749,990 | 6/1988 | Birkner ...................................... 702/16 |
| 4,876,673 | 10/1989 | McCowan ................................. 702/16 |
| 5,051,962 | 9/1991 | Eaton . |
| 5,237,539 | 8/1993 | Selman . |

FOREIGN PATENT DOCUMENTS

WO 93/05600   3/1993   WIPO .

*Primary Examiner*—Donald E. McElheny, Jr.
*Attorney, Agent, or Firm*—Danita J.M. Maseles

[57] ABSTRACT

The present invention provides a system, apparatus and method for transmitting logging data from a primary location to a remote location in near real time. The logs can be viewed almost simultaneously at the primary and remote locations, as data is being acquired. The present invention also provides for a system for viewing logs in near real time at a primary location and a remote location which includes a first means for reading while writing at the primary location, a second means for reading while writing at the remote location which is identical to the first means for reading while writing, a first file system at the primary location, the first file system having data written to it by the first means for reading while writing as numerical data or graphics data, a first rendering means for reading the graphics data from the first file system and rendering the graphics data so that it can be displayed, a first display means for displaying the rendered graphics data, a first file transfer utility means for transmitting the data from the primary location to the remote location over a communications system, a second file transfer utility means for receiving the data at the remote location, a second file system at the remote location, to which the second file transfer utility means writes the received data using the second means for reading while writing, a second rendering means for reading graphics data from the second file system and rendering the graphics data so that it can be displayed, a input interface means which directs signals from an user input to the second rendering means to adjust the display of the log, and a second display means for displaying the rendered graphics data at the remote location.

121 Claims, 15 Drawing Sheets

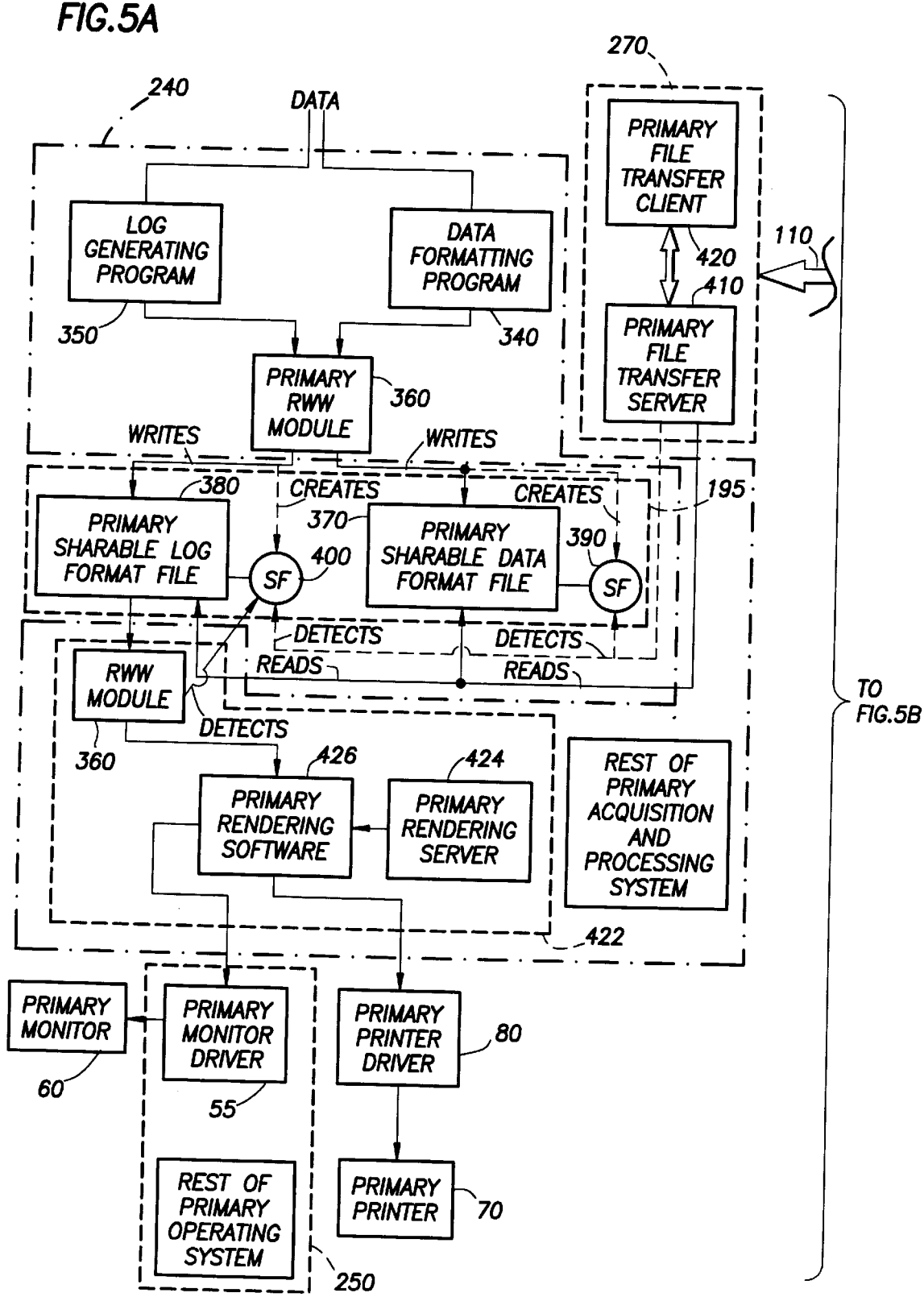

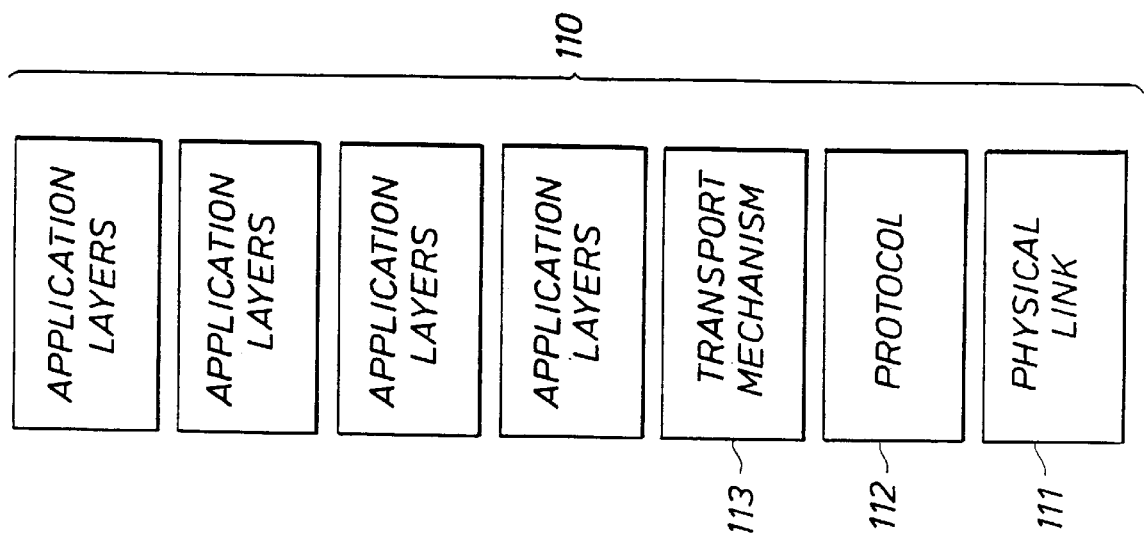

APPARATUS, SYSTEM AND METHOD TO TRANSMIT AND DISPLAY ACQUIRED WELL DATA IN NEAR REAL TIME AT A REMOTE LOCATION

TECHNICAL FIELD

This invention relates in general to the field of processing and viewing acquired well data, and more particularly to an improved apparatus, system and method of viewing acquired well data in near real time at a location remote from the acquisition.

BACKGROUND OF THE INVENTION

In the oil and gas industry, operating companies which own and/or manage hydrocarbon wells evaluate the wells by wireline logging. In wireline well logging, one or more tools are connected to a power and data transmission cable or "wireline" and are lowered into the well borehole to obtain measurements of geophysical properties for the area surrounding the borehole. The wireline supports the tools as they are lowered into the borehole, supplies power to the tools and provides a communication medium to send signals to the tools and receive data from the tools. Commonly, tools are lowered to a depth of interest in the well and are then retrieved. As the tools are retrieved, they send data about the geological formations through which they pass through the wireline to data acquisition and processing equipment at the surface, usually contained inside a logging truck or a logging unit.

The data acquisition and processing equipment, including software, compiles the data from the tools into a "log," a plot which presents the geophysical information concerning the geological formations encountered by the well, frequently by depth. Logs can also be used to evaluate current production from producing wells or to inspect the integrity of production equipment in a producing well. In any case, the data gathered during the logging operation is generally presented on the log by depth, but may also be presented by time, or any other index by which multiple physical entries are recorded. U.S. Pat. No. 5,051,962 (incorporated by reference) describes such a well logging system controlled by a general purpose computer programmed for real time operation. Various data acquisition and processing software programs are known in the art. An example of data acquisition and processing software is Schlumberger's proprietary MAXIS™ system, which is a suite of separate computer programs.

The data acquisition and processing software writes the log data to two types of locked format files on disk. By "locked," it is meant that the format files cannot be written to and read from at the same time. The two types of locked format files are distinguished by the type of information they contain: one is a data format file and the other is a graphics format file. The data format file contains the numerical properties of the log data; the graphics format file contains the pictorial representation of the data. The data acquisition and processing software continues writing the log data to the locked data format file and the locked graphics format file until the log is complete. Then the data from the locked data format file and the locked graphics format file may be translated from digital readings into physical form by a marking device such as a printer. In addition to the locked data format file and the locked graphics format file, the data acquisition and processing software may send the log data to a viewing monitor, via a renderer. Using the monitor, the well logging professional ("logging engineer") conducting the logging operation can view the log as it is being compiled.

After the log is compiled, it can be transmitted to the operating company's headquarters for interpretation and review by management. The paper log may be sent directly from the wellsite to the operating company as a facsimile. Alternatively, the completed locked data format file can be sent from the wellsite to a data processing center via satellite using a protocol such as DECNET. The data processing center could in turn transmit the log as a facsimile to the operating company. As another alternative, the completed locked data format file can be sent from the wellsite to an operating company using a computer program such as Blast™ by U.S. Robotics.

The data acquired by logging is often crucial to the decision-making process on what will be done with the well being logged. Take, for example, a well which has just been drilled and logged. Depending on the results of the log, the well could be drilled deeper, plugged and abandoned as non-productive or cased and tested—or perhaps the decision will be that additional logs are required before the decision on the disposition of the well can be made. The results of the log may also help determine whether the well requires stimulation or special completion techniques, such as gas lift or sand control. In any case, these decisions are crucial and have to be made very quickly. Mistakes or even mere delay can be extremely expensive.

Because log interpretation is part art and part science, the operating company which is drilling or producing the well frequently desires to have its own personnel viewing the log data as the well is being logged. But the operating company may be located half a world away from the well itself. Drilling and production activities are often located in remote locations and it is difficult for the operating company to have its own personnel, such as a geologist or petrophysicist, join the wireline company's logging engineer on site during the logging operation. Sometimes logistics or severe weather conditions prevent the operating company from sending anyone to the wellsite for the logging operation. Furthermore, sending personnel to wellsites is expensive and exposes them to all of the hazards of the drilling or production operation, as well as the hazards and inconvenience of travel. As a consequence, tentative decisions often have to be made before the operating company can complete its review of the actual logging data, relying solely on the interpretations conducted at the welisite.

Accordingly, a need exists for a system or method which would allow the operating company personnel at a location remote from the wellsite to view the log as it is compiled in at least near real time.

A further need exists for a system or a method which will allow real time communication during a logging operation between persons at a remote location viewing the logging data and the well logging engineer.

Because the data from the logging operation is of a highly competitive nature and is extremely confidential, a need exists for a system or method which will send well data from a wellsite to a remote location in near real time, in such a way that the data is not susceptible to being misdirected or lost.

A further need exists for a system or a method which will allow persons to view the logging data in near real time, without the expense of travelling to the wellsite and without being exposed to the hazards of the wellsite.

SUMMARY OF THE INVENTION

In accordance with the present invention, an apparatus, system and method are provided that substantially eliminate or reduce the disadvantages and problems associated with the previously developed file transfer systems.

The present invention provides for an apparatus for viewing a log in near real time at a primary location and a remote location which includes, at the primary location, a first means for reading while writing the log to a first file, a first renderer at the primary location for reading the log as it is being written to the first file and for rendering the log, a primary monitor for receiving signals from the first renderer and for viewing the rendered log at the primary location, a means for transmitting the log from the first file at the primary location as it is being written to the remote location over a communication means, which includes a physical link, a protocol and a transport mechanism, a second means at the remote location for reading while writing, which writes the log as it is received from the primary location to a second file at the remote location, a second renderer at the remote location for reading the log as it is being written to the second file and rendering the log, and a remote monitor for receiving signals from the second renderer and for viewing the rendered log at the remote location.

The present invention also provides for an apparatus for viewing logs in near real time at a primary location and a remote location which includes a first format file at a primary location with data and a second format file at a secondary location, a means for reading while writing the data to the first format file and the second format file, a communications means which includes a physical link, a protocol and a transport mechanism, and a first file transfer utility program and a second file transfer utility program, the first file transfer utility program for retrieving data from the first format file in near real time using the means for reading while writing and for transferring the data from the first format file to a second file transfer utility program over the communications means, the second file transfer utility program for writing the data in near real time to the second format file using the means for reading while writing. The present invention may further include a first means at the primary location for obtaining the data from the format file and for rendering the log data into images for display on a first display means at the primary location, and a second means at the primary location for obtaining the log data from the data format file and for rendering the log data into images for display on a second display means at the remote location.

The present invention also provides for a system for viewing logs in near real time at a primary location and a remote location which includes a first means for reading while writing at the primary location, a second means for reading while writing at the remote location which is identical to the first means for reading while writing, a first file system at the primary location, the first file system having data written to it by the first means for reading while writing as numerical data or graphics data, a first rendering means for reading the graphics data from the first file system and rendering the graphics data so that it can be displayed, a first display means for displaying the rendered graphics data, a first file transfer utility means for transmitting the data from the primary location to the remote location over a communications system, a second file transfer utility means for receiving the data at the remote location, a second file system at the remote location, to which the second file transfer utility means writes the received data using the second means for reading while writing, a second rendering means for reading graphics data from the second file system and rendering the graphics data so that it can be displayed, a input interface means which directs signals from an user input to the second rendering means to adjust the display of the log, and a second display means for displaying the rendered graphics data at the remote location. More specifically, the first means for reading while writing may a read while write module. The second means for reading while writing may be a read while write module identical to the first read while write module. The first file system may include a first format file or may include a first data format file and a first log format file The first rendering means may include a first rendering software, a rendering server and a third means for reading while writing identical to the first means for reading while writing. The first display means may include a first monitor and/or a first printer. The first file transfer utility means may include a first file transfer server and/or a first file transfer client. The first file transfer server and/or the first file transfer client may include a copy of the first means for reading while writing. The first rendering software may include a first reader/interpreter means, a first object builder, a first object rendering module, and a first output module. The first reader/interpreter means may be a first reader/interpreter or may be the combination of a first reader and a first interpreter. The second file transfer utility means may include a second file transfer server and/or a second file transfer client. The second file system may include a second format file or a second data format file and a second log format file. The second rendering means may include a second rendering software, and a fourth means for reading while writing identical to the first means for reading while writing. The second rendering software may include a second reader/interpreter means, a second object builder, a second object rendering module, and a second object module. The second reader/interpreter means may be a reader/interpreter the combination of a reader and an interpreter. The input interface means may include an input, a message handler module and an user interface module. The second display means may include a second monitor, a second printer or a native printer. The communication system may include a physical link, a protocol and a transport mechanism. The protocol may be TCP/IP. The physical link may be satellite communication, telephone communication, communication via microwave transmission, radio communication, cellular communication or communication via modem. The communication system may also allow for person to person communication between the primary location and the remote location. The personal communication may be typed (chat box) communication, audio communication, video communication, or electronic whiteboard communication. The primary location may be a wellsite and the invention may also include a data acquisition system for acquiring data from logging tools and sending it to the first means for reading while writing for storage onto the first file system.

The present invention also provides a system for viewing logs in near real time at a primary location and a remote location which includes a first read while write module at the primary location, a second read while write module at the remote location which is identical to the first read while write module, a first data format file at the primary location having numerical data written to it by the first read while write module, a first log format file at the primary location having graphical data written to it by the first read while write module, a first rendering software suite for reading the graphics data from the first log format file and rendering the graphics data so that it can be displayed, a first monitor means for displaying the rendered graphics data at the primary location, a first printer means for displaying the rendered graphics data at the primary location, a first file transfer utility means for transmitting the data from the primary location to the remote location over a communications system, the communication system including a physical link, a protocol and a transport mechanism, a second file transfer utility means for receiving the data at the remote location, a second data format file at the remote location to which the second file transfer utility means writes the received numerical data using the second means for reading while writing, a second log format file at the remote location to which the second file transfer utility means writes the received graphical data using the second means for reading while writing, a second rendering software suite for reading graphics data from the second log format file and rendering the graphics data so that it can be displayed, a input interface means which directs signals from an user input to the second rendering means to adjust the display of the log, and a second display means for displaying the rendered graphics data at the remote location. More specifically, the first rendering software suite may include a first rendering software, a rendering server and a third read while write module identical to the first read while write module. The first monitor means may include a first monitor and the first printer means may include a first printer. The first file transfer utility means may includes a first file transfer server a first file transfer client. The first file transfer server and/or the first file transfer client may include a copy of the first means for reading while writing. The first rendering software may include a first reader/interpreter means, a first object builder, a first object rendering module, and a first output module. The first reader/interpreter means may be a first reader/interpreter the combination of a first reader and a first interpreter. The second file transfer utility means may include a second file transfer server or a second file transfer client. The second rendering means may include a second rendering software, and a fourth means for reading while writing identical to the first means for reading while writing. The second rendering software may include a second reader/interpreter means, a second object builder, a second object rendering module, and a second object module. The second reader/interpreter means comprises a reader/interpreter the combination of a reader and an interpreter. The input interface means may include an input, a message handler module and an user interface module. The second display means may include a second monitor, a second printer and/or a native printer. The protocol may be TCP/IP. The physical link may be satellite communication, telephone communication, communication via microwave transmission, radio communication, cellular communication or communication via modem. The communication system may also allow for person to person communication between the primary location and the remote location. The personal communication may be typed (chat box) communication, audio communication, video communication or electronic whiteboard communication. The primary location may be a welisite and the invention may also include a data acquisition system for acquiring data from logging tools and sending it to the first means for reading while writing for storage onto the first data format file and the first log format file.

The present invention also provides a method for viewing a log in near real time at a primary location and a remote location which includes the steps of writing data including numerical data and graphics data to a first file system at the primary location, reading the data from the first file system while writing it, rendering the graphics data so that it can be displayed at the primary location, displaying the graphics data at the primary location, reading the data while it is being written and transferring the data from the primary location to the remote location over a communication system, the communication system including a physical link, a protocol and a transport mechanism, receiving the data at the remote location, writing the data as it is being received to a second file system at the remote location, reading the data from the second file system while writing it, rendering the graphics data from the second file system so that it can be displayed at the remote location, and displaying the graphics data at the remote location. The invention may also include the step of adjusting the display of the log at the second location responsive to user input. The log may displayed at the remote location on a remote monitor, a remote printer, or a native printer. The communication systems protocol may be TCP/IP. The physical link may be satellite communication, telephone communication, communication via microwave transmission, radio communication, cellular communication or communication via modem. The communication system may also allow for person to person communication between the primary location and the remote location. The personal communication comprises typed (chat box) communication, audio communication, video communication or electronic whiteboard communication.

The present invention also provides for an apparatus for sharing a data file between a primary location and a remote location which includes a first means for reading while writing at the primary location, a second means for reading while writing at the remote location which is identical to the first means while writing, a first file system at the primary location, the first file system having data written to it by the first means for reading while writing as either numerical data or graphics data, a first rendering means for reading the graphics data from the first file system and rendering the graphics data so that it can be displayed at the primary location, a first display means for displaying the rendered graphics data at the primary location, a first file transfer utility means for transmitting the data from the primary location to the remote location over a communications system, the communication system including a physical link, a protocol and a transport mechanism, a second file transfer utility means for receiving the data at the remote location, a second file system at the remote location, to which the second file transfer utility means writes the received data using the second means for reading while writing, a second rendering means for reading graphics data from the second file system and rendering the graphics data so that it can be displayed at the remote location, a input interface means which directs signals from an user input to the second rendering means to adjust the display of the log, and a second display means for displaying the rendered graphics data at the remote location.

1. The present invention also provides for an apparatus for viewing logs in near real time at a primary location, a first remote location and one or more supplementary remote locations which includes a first read while write module at the primary location, a second read while write module at the first remote location which is identical to the first read while write module, a first data format file at the primary location having numerical data written to it by the first read while write module, a first log format file at the primary location having graphical data written to it by the first read while write module, a first rendering software suite for reading the graphics data from the first log format file and rendering the graphics data so that it can be displayed, a first monitor means for displaying the rendered graphics data at the primary location, a first printer means for displaying the rendered graphics data at the primary location, a first file transfer server for transmitting the data from the primary location to the first remote location over a communications system, the communication system including a physical link, a protocol and a transport mechanism, a second file transfer client for receiving the data at the first remote location and sending it to a tertiary file transfer client at the supplementary remote location, a second data format file at the remote location to which the second file transfer client writes the received numerical data using the second means for reading while writing, a second log format file at the remote location to which the second file transfer client writes the received graphical data using the second means for reading while writing, a second rendering software suite for reading graphics data from the second log format file and rendering the graphics data so that it can be displayed, a input interface means which directs signals from an user input to the second rendering means to adjust the display of the log at the first remote location, a second display means for displaying the rendered graphics data at the first remote location, a tertiary data format file at the supplemental remote location to which the tertiary file transfer client writes the received numerical data using a tertiary means for reading while writing, the tertiary means for reading while writing being identical to the first means for reading while writing, a tertiary log format file at the remote location to which the tertiary file transfer client writes the received graphical data using the tertiary means for reading while writing, a tertiary rendering software suite for reading graphics data from the tertiary log format file and rendering the graphics data so that it can be displayed at the supplemental remote location, a second input interface means which directs signals from an second user input to the tertiary rendering means to adjust the display of the log at the supplemental remote location, and a tertiary display means for displaying the rendered graphics data at the supplemental remote location.

An advantage of the present invention is logging data can be transmitted from a wellsite to a remote location, or a plurality of remote locations, for viewing in near real time.

Another advantage of the present invention is that it allows real time communication during the logging operation between persons at the remote location viewing the log and the logging engineer at the wellsite.

Another advantage of the present invention is that it allows secure transmission of the well data from the wellsite to the remote location.

Another advantage of the present invention is that it promotes safety and reduces cost by obviating or reducing the need to have additional personnel on the wellsite in order to view the acquisition of logging data in near real time.

BRIEF DESCRIPTION OF THE DRAWINGS

FIG. 5A illustrates the data acquisition and processing software and other software programs at the primary location and the file transfer to the remote location.

FIG. 8 illustrates the communication system.

DESCRIPTION OF A PREFERRED EMBODIMENT

Figure 1:
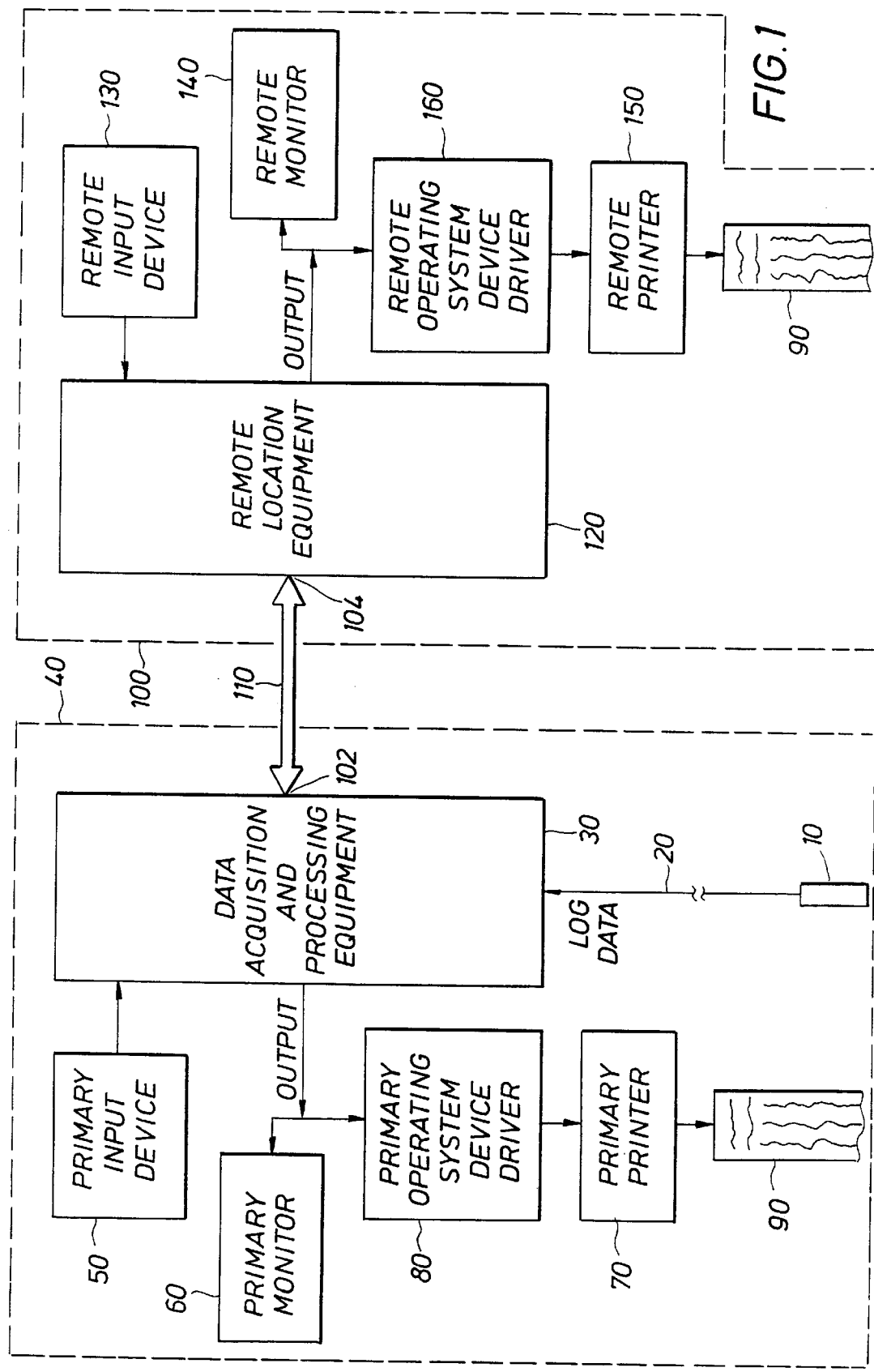
FIG. 1 illustrates a primary location in communication with a remote location according to the present invention.

The above-noted and other aspects of the present invention will become more apparent from a description of a preferred embodiment, when read in conjunction with the accompanying drawings. The drawings illustrate the preferred embodiment of the invention described. In the drawings, the same members have the same reference numerals.

The above-noted and other aspects of the present invention will become more apparent from a description of a preferred embodiment, when read in conjunction with the accompanying drawings. The drawings illustrate the preferred embodiment of the invention. In the drawings, the same members have the same reference numerals.

I. Overview

As described in co-pending U.S. patent application Ser. No. 08/772,712, incorporated by reference, and as illustrated in FIG. 1, during logging operations, log data is sent from a logging tool 10 through wireline 20 to a data acquisition and processing system 30 at a wellsite or primary location 40. ("Primary is used in the sense of the word "first," not "most important.") A primary input device 50, such as a keyboard and/or a mouse, allows human input into the data acquisition and processing system 30. Outputs to the data acquisition and processing system 30 include a primary monitor 60, and a primary printer 70, which acts through a primary printer driver 80 to print a log 90. The data acquisition and processing system 30 communicates with a remote location 100 through a communication channel 110. The remote location 100 has a remote location equipment 120, a remote input device 130 for human input, such as a keyboard and/or a mouse, and outputs, such as a remote monitor 140 and a remote printer 150 which acts through a remote printer driver 160 to produce a log identical to the log 90 produced at the primary location. (Although the logs have separate physical existences, both logs are given the reference number 90 to indicate this identity.)

Continuing to refer to FIG. 1, the data acquisition and processing equipment 30 and the remote location equipment 120 establish communication over the communication system 110. Preferably, the communication system 110 uses TCP/IP protocol and is based on a physical link, such as hard-wire, cellular, radio, microwave, satellite or telephone transmission. In alternative embodiments, other types of point-to-point network protocols, such as Blast by U.S. Robotics, DECNET or UDP may be used. In still other embodiments, other types of communication systems could be used. If using the TCP/IP protocol, both the data acquisition and processing equipment 30 and remote location equipment 120 have individual IP addresses 102, 104 in accordance with the TCP/IP protocol. The bandwidth of the communication system 110 is preferably at least 10 kilobits per second. As illustrated in FIG. 8, the components of the communication system 110 include a physical link 111, the protocol 112 such as TCP/IP, and the transport mechanism 113, as well as other components illustrated.

Figure 2:
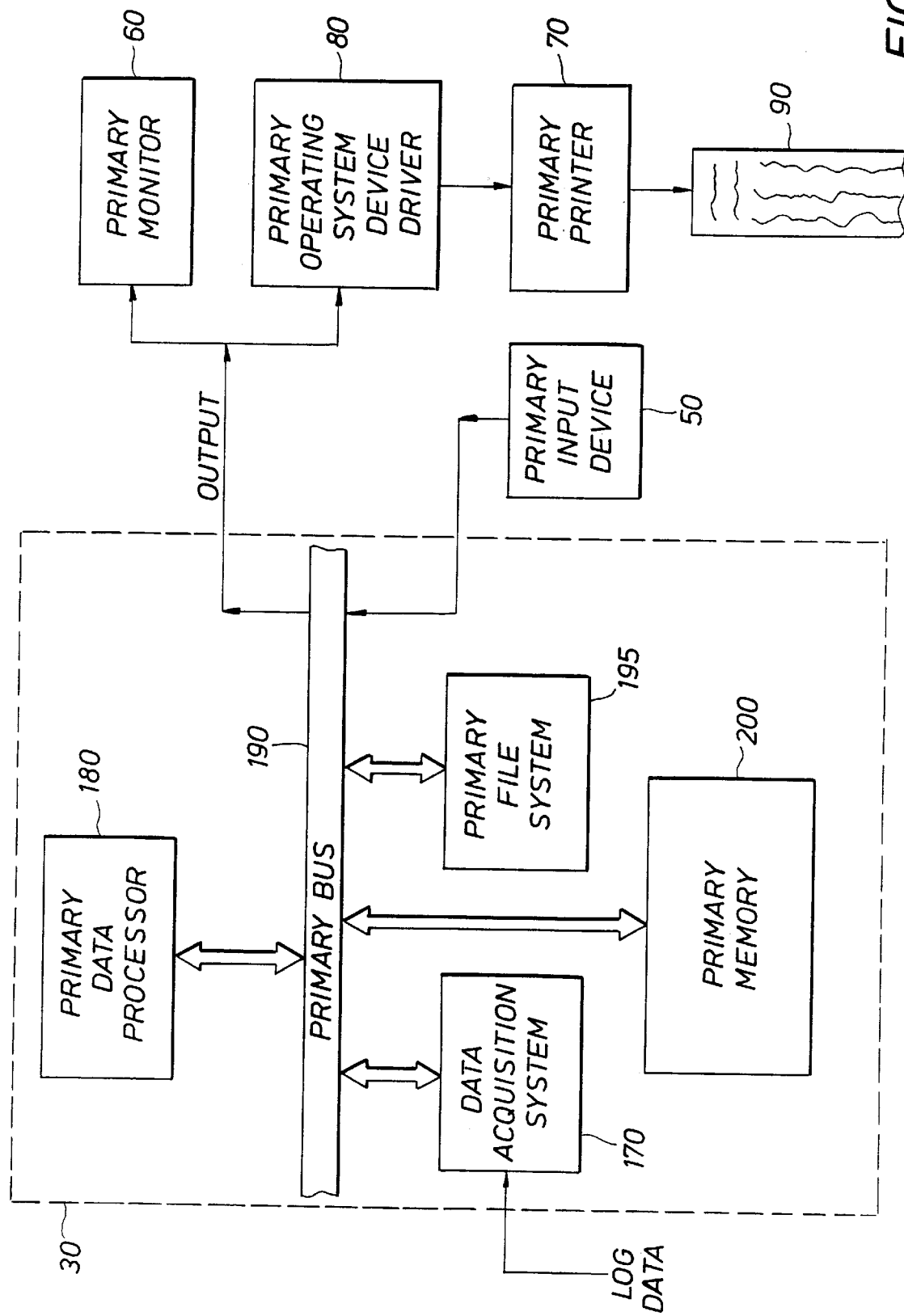
FIG. 2 illustrates the data acquisition and processing equipment of the primary location, including inputs and outputs.

FIG. 2 illustrates the data acquisition and processing equipment present at the primary location 40, including its inputs and outputs. As illustrated in FIG. 2, the log data enters the data acquisition and processing equipment 30 through a data acquisition system 170. The data acquisition and processing equipment 30 also includes a primary data processor 180, a primary bus 190, a primary file system 195, and a primary memory 200. The primary input device 50, the primary monitor 60, the primary printer 70, the primary printer driver 80, and the log 90 are also illustrated.

Figure 3:
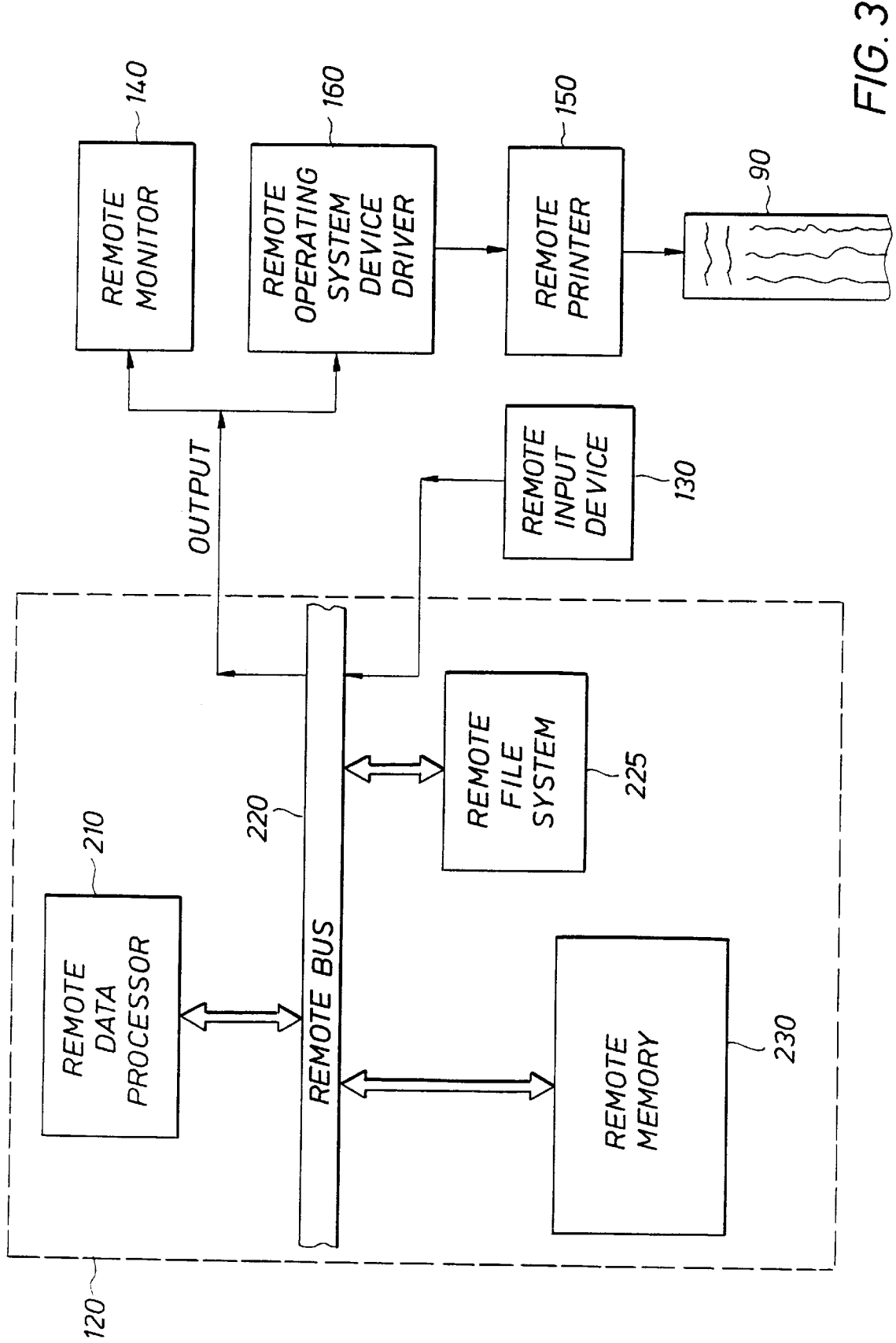
FIG. 3 illustrates the remote location equipment, including inputs and outputs.

FIG. 3 illustrates the remote location equipment 120, including its inputs and outputs. As illustrated in FIG. 3, the remote location equipment 120 includes a remote data processor 210, a remote bus 220, a remote file system 225, and a remote memory 230. The remote input device 130, a remote display device such as the remote monitor 140, the remote printer 150 and/or a native printer 994, the remote printer driver 160, and the log 90 are also illustrated. The remote data processor 210 is preferably a Pentium PC (P5-90 or higher), with an Ethernet interface or a modem. The remote memory 230 has preferably at least 32 Megabyte RAM.

Figure 4A:
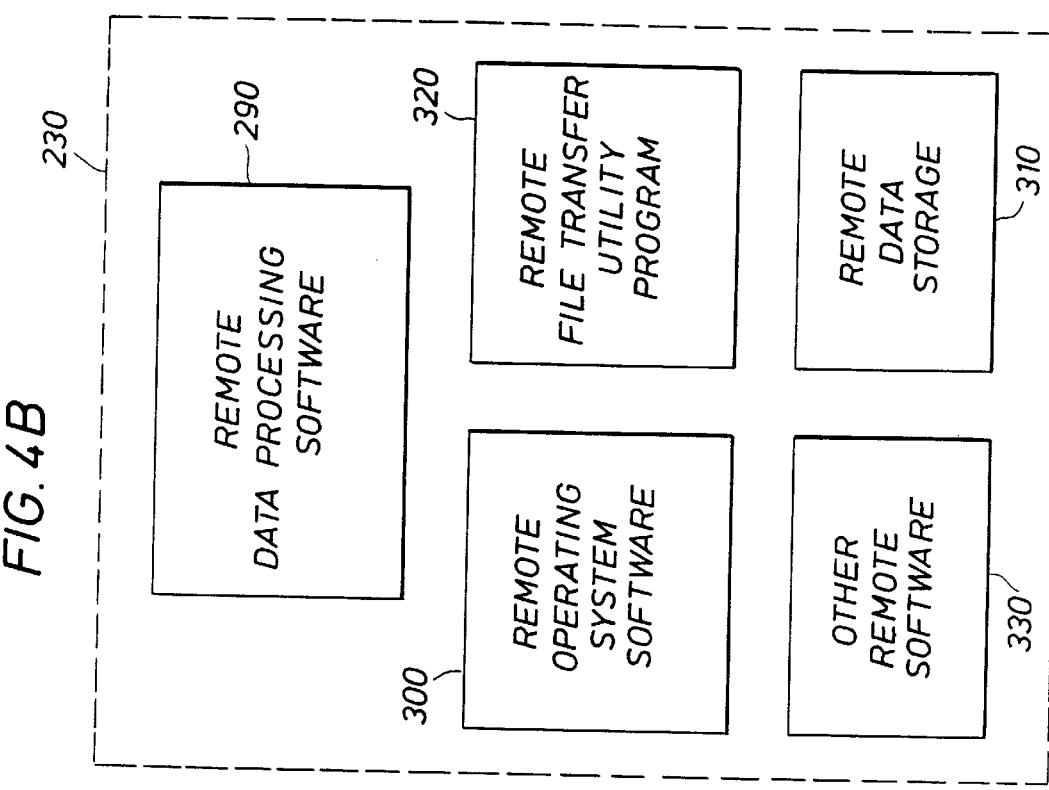
FIG. 4A illustrates the components of the primary memory.

FIG. 4A illustrates the components of the primary memory 200. As illustrated in FIG. 4A, the primary memory 200 includes a primary data acquisition and processing software 240, a primary operating system software 250, a primary data storage 260, a primary file transfer utility program 270 and other primary software 280. The primary operating system software 250 is preferably Windows® NT™ by Microsoft Corporation. If near real time viewing is not desired, OpenVMS by Digital Equipment Corporation or other operating systems may be used.

Figure 4B:
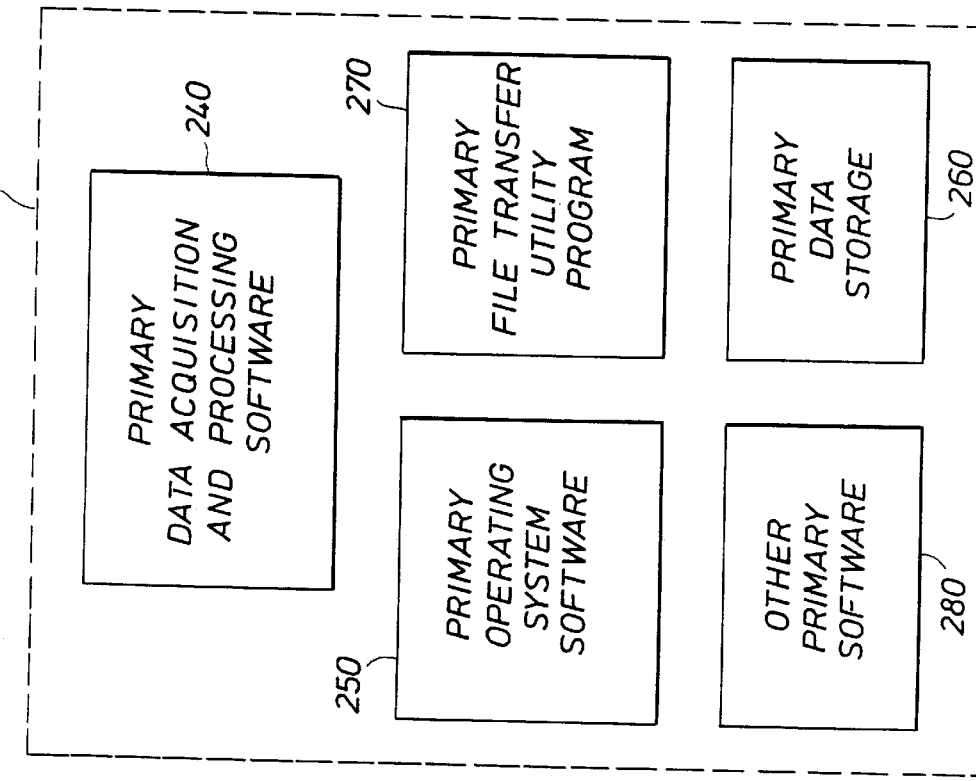
FIG. 4B illustrates the components of the remote memory.

FIG. 4B illustrates the components of the remote memory. As illustrated in FIG. 4B, the remote memory 230 includes a remote data processing software 290, a remote operating system software 300, a remote data storage 310, a remote file transfer utility program 320 and other remote software 330. The remote operating system software 300 is preferably Windows® NT™ by Microsoft Corporation.

II. At the Primary Location

Figure 5B:
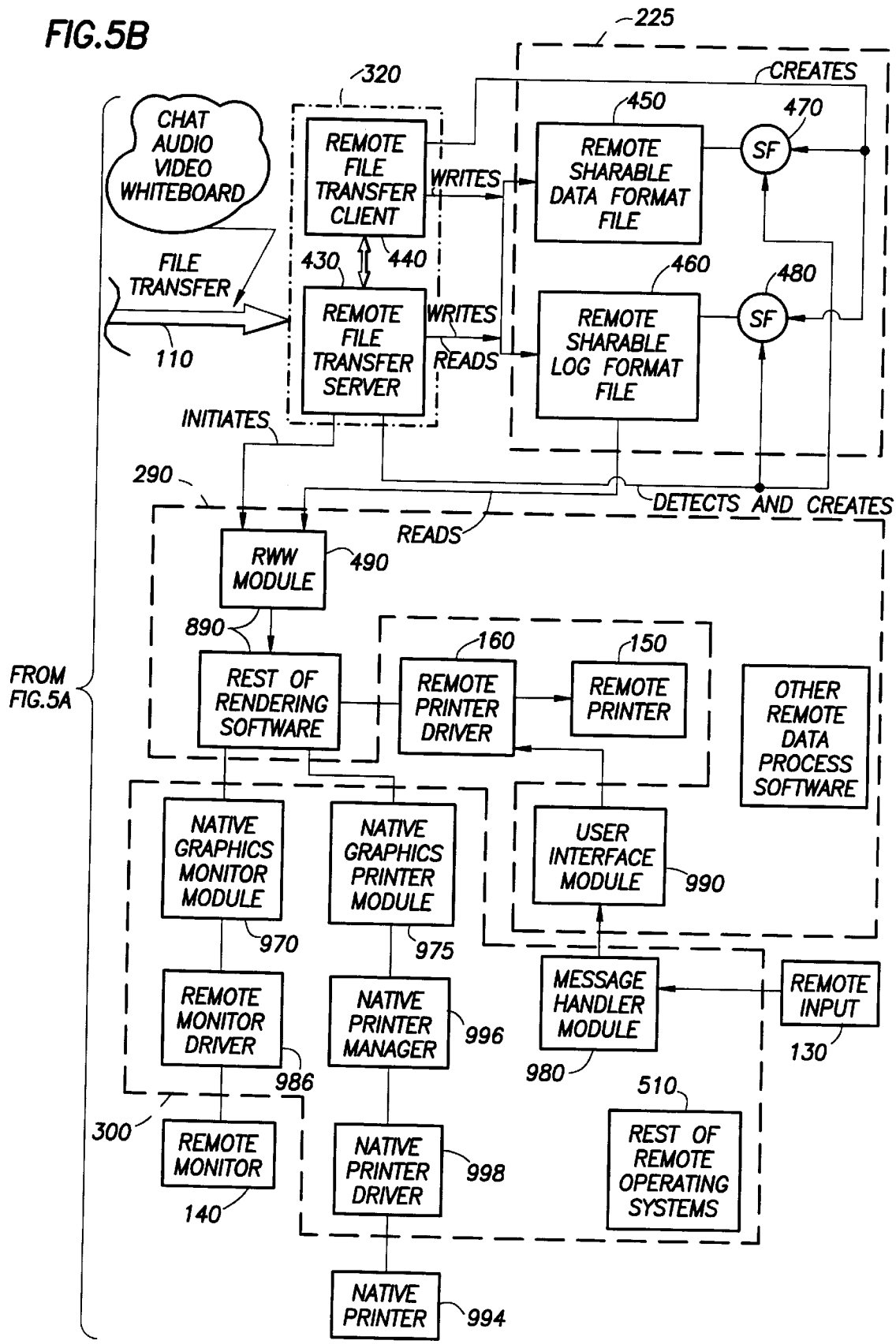
FIG. 5B illustrates the remote data processing software and other software programs at the remote location and the file transfer to the primary location.

FIG. 5A illustrates the data acquisition and processing software 240 and other software programs at the primary location and FIG. 5B illustrates the remote data processing software 290 and other software programs at the remote location. As log data enters the data acquisition and processing software 240, the data enters a primary data formatting program 340 where it is formatted as numerical data in industry standard format for storage. The data also enters a log generating program 350 which adds commands and other instructions to the data to create graphics data. The numerical data includes numerical properties of the data; the graphics data includes pictorial representation of the data.

The data formatting program 340 and the log generating program 350 act through a primary read-while-write ("RWW") module 360 to write the data as it is received to a primary sharable data format file 370 and to one or more primary sharable log graphics files 380, respectively. (Different primary sharable log graphics files 380 may be created for different presentations of the same log data.)

Unlike a locked format file, a sharable format file allows shared file access, such that the sharable format file may be written to and read from at the same time. Preferably, each sharable format file contains all of the acquired data and input parameters for a single logging run, that is, for the data from a set of logging tools run into the well simultaneously.

As the primary RWW module 360 begins to write logging data to the primary sharable data format file 370 and the primary sharable graphics format file 380, the primary RWW module 360 also creates for each of the primary sharable data format file 370 and for the primary sharable graphics format file, 380, a primary semaphore file, 390, 400 respectively. The primary semaphore files 390,400 have the same name as the primary sharable format file for which they were created, with the addition of a "_smf" at the end. The existence of a semaphore file indicates that the primary sharable format file with the similar name is a sharable file. Any program which shares access to the sharable format file also uses a copy of the primary RWW module to check for the existence of the associated semaphore file to determine whether the format file is sharable.

Continuing to refer to FIG. 5A, the primary file transfer utility program 270 may include a primary file transfer server 410, also shown in FIG. 5B and/or a primary file transfer client 420. As illustrated by FIG. 5B, the remote file transfer utility program 320 may include a remote file transfer server 430 and/or a remote file transfer client 440. The minimum needed is a file transfer server in either the primary or remote location and a file transfer client in the other location. But there may be a file transfer server and a file transfer client in each location.

Figure 11A:
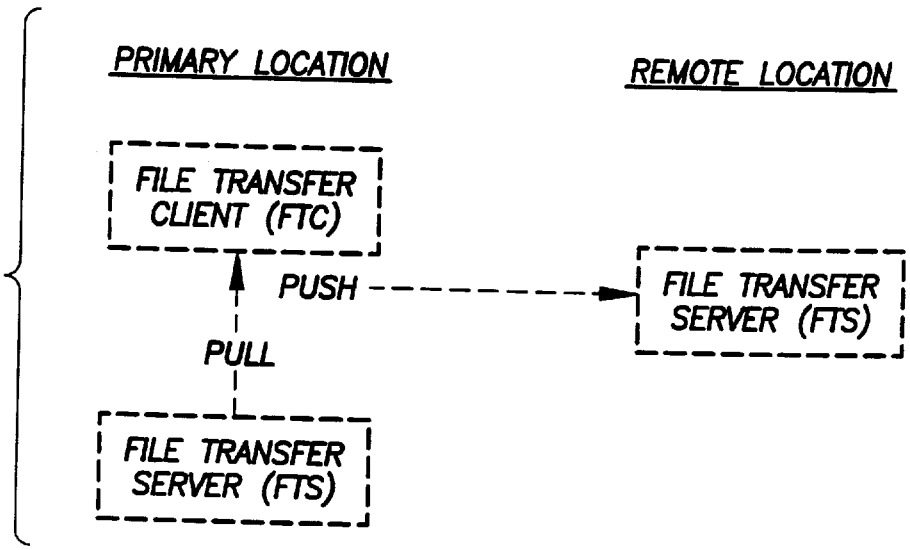
FIG. 11A–11G illustrate the different scenarios for file transfer and viewing data in near real time.
Figure 11B:
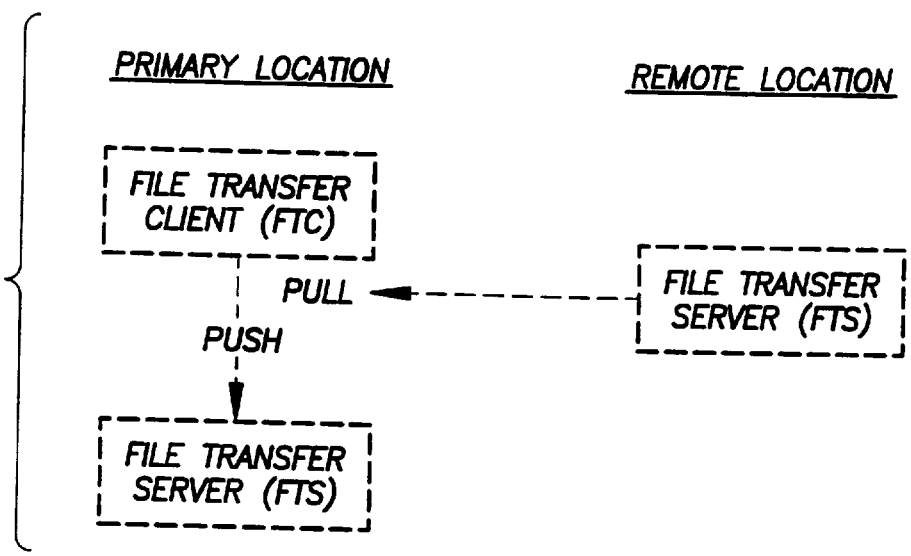
Figure 11C:
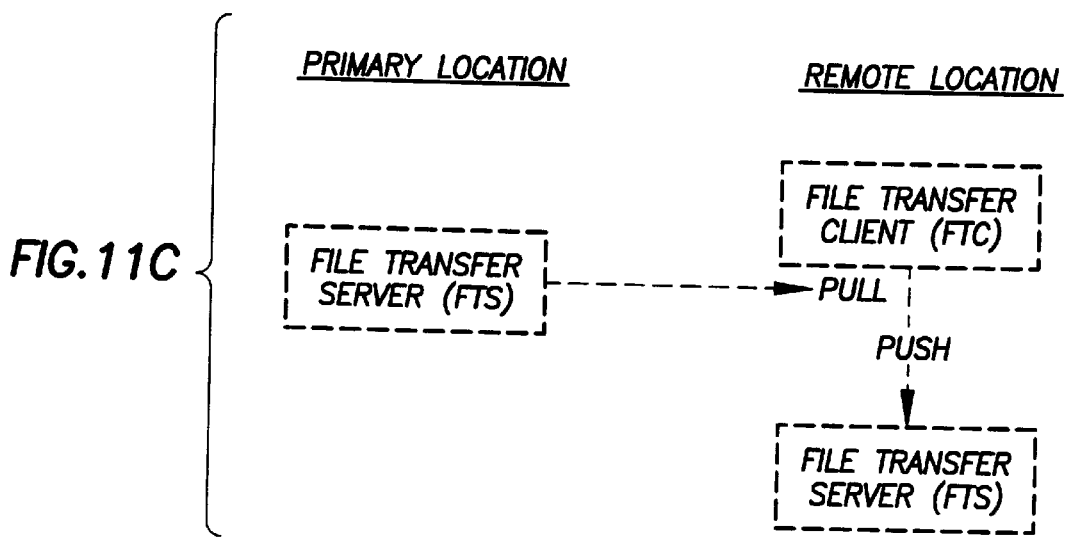
Figure 11D:
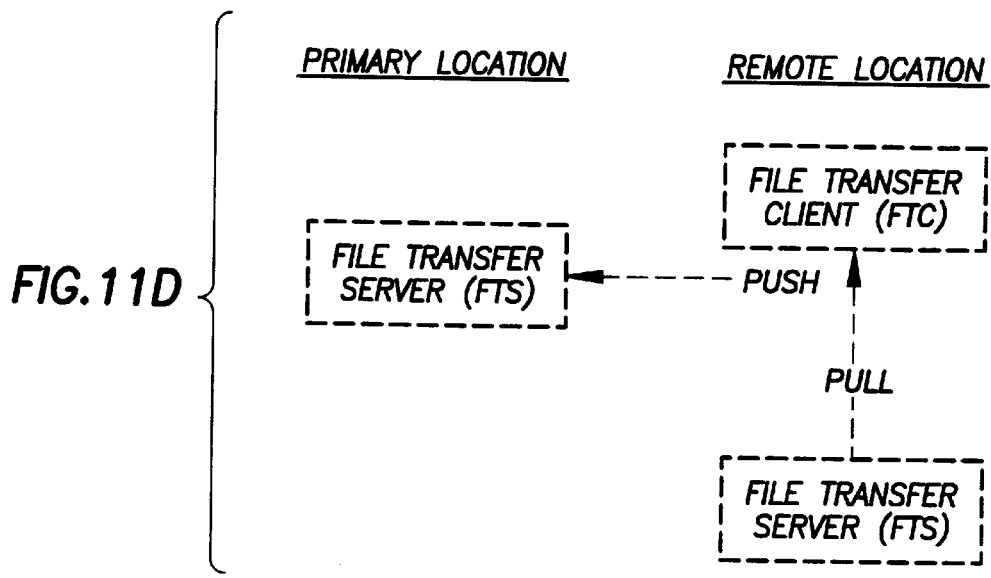
Figure 11E:
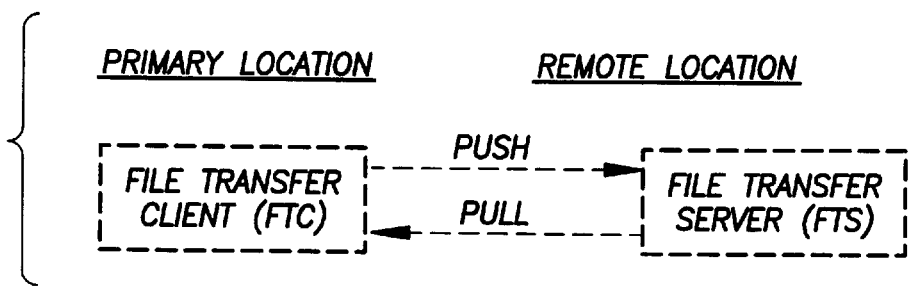
Figure 11F:
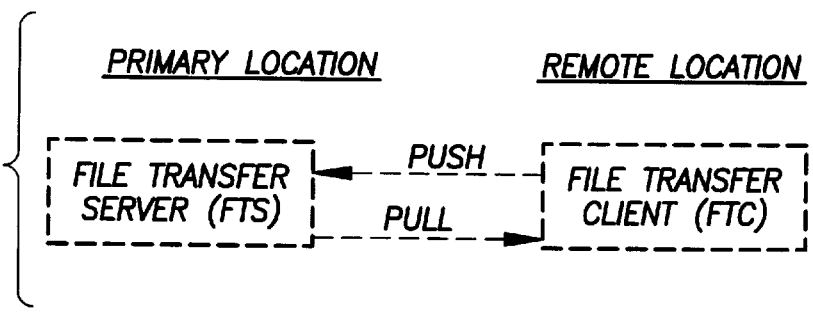
Figure 11G:
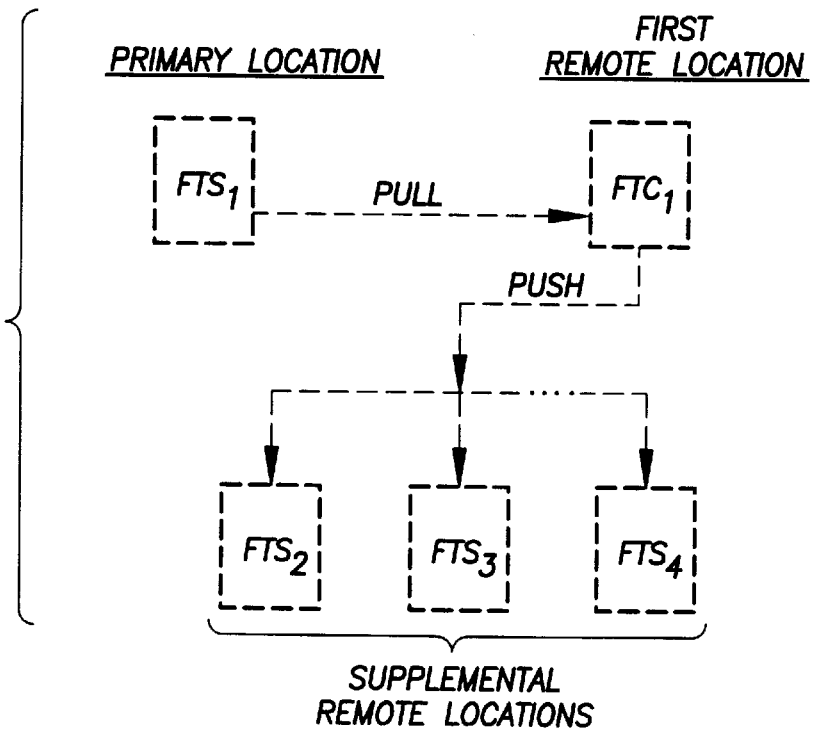

The primary file transfer server and the remote file transfer server are always on and are always listening for requests from one of the file transfer clients. The file transfer clients are not always on, but send requests or queries to the file transfer server as initiated by a request from the user through the input device. One file transfer server may handle requests from more than one file transfer client. A file transfer client may re-transmit files it receives from a file transfer server to one of more other secondary file transfer servers at different locations simultaneously. (See FIG. 11G). File transfer clients may or may not read from or write to one of the format files. A file transfer server reads from and writes to a format file. Different scenarios for data requests between file transfer clients and servers are found in FIGS. 11A through 11G.

As illustrated in FIG. 5A, the rendering suite 422 may include a primary rendering server 424, a primary rendering software 426 and a copy of the RWW module 360. The primary rendering suite 422 renders the graphics data as described below and sends it to either a primary monitor 60 or a primary printer 70 through a primary monitor driver 55 and a primary printer driver 80, respectively.

Figure 9:
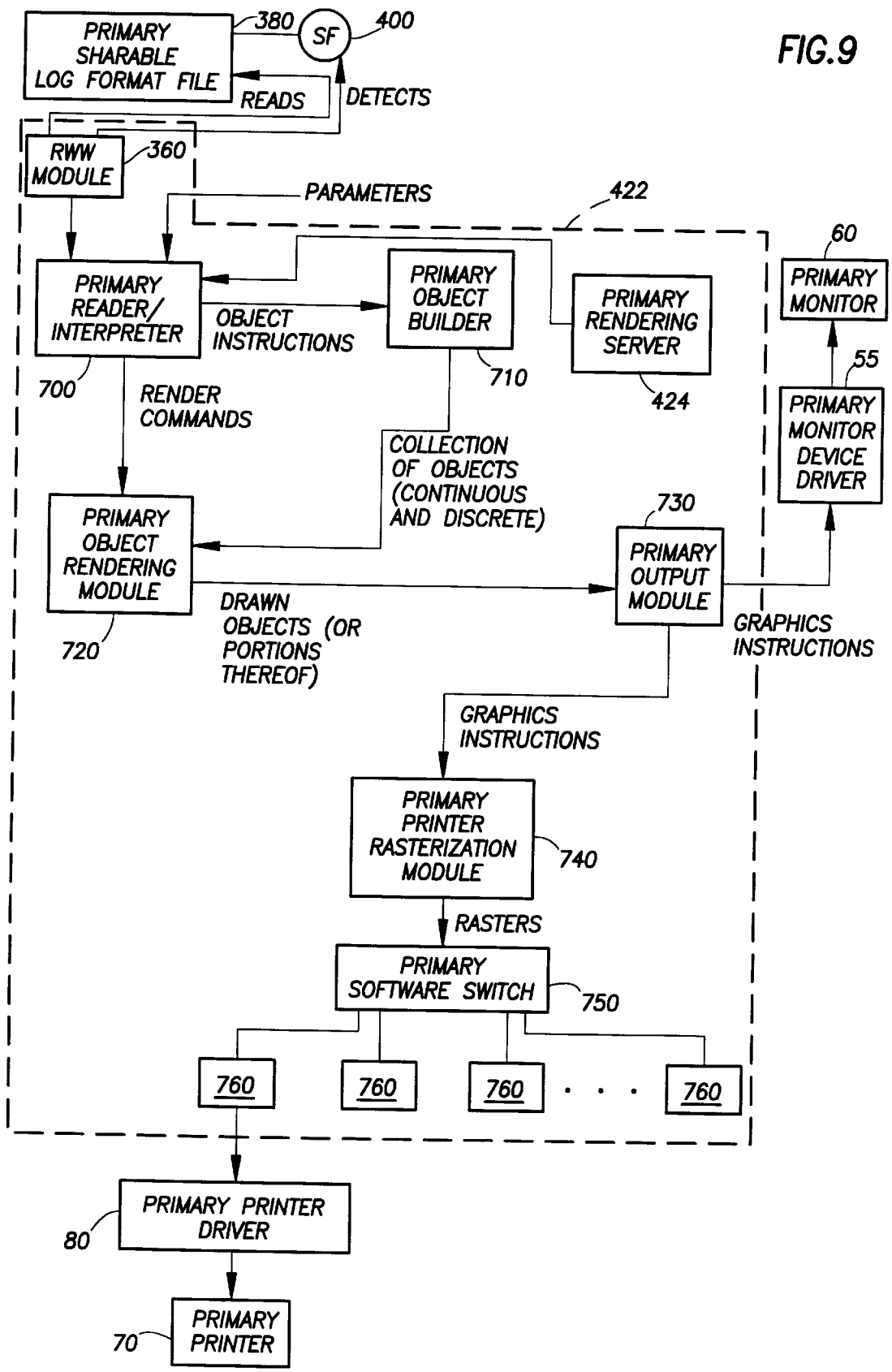
FIG. 9 illustrates the primary rendering software suite.

As illustrated in greater detail in FIG. 9, the primary rendering software suite 422 may include a primary rendering server 424, a primary rendering software 426 and a copy of the RWW module 360. The primary rendering software 426 may include a primary reader/interpreter 700, a primary rendering server 424, a primary object builder 710, a primary object rendering module 720, a primary output module 730, a primary printer rasterization module 740, a primary software switch 750, and one or more primary printer formatting modules 760. The functions of the primary reader/interpreter 700 could be performed by a primary reader and an primary interpreter. The primary rendering server 424 provides a function of a "traffic cop" for the primary rendering software suite 422 by transmitting print requests and parameters to the primary rendering software 426. The well logging professional conducting a logging operation, or printing log data from format files, may input one or more parameters through the primary input device 50 into the data acquisition and processing equipment 30 or the data acquisition and processing equipment 30 may itself derive or retrieve the parameters from memory. The parameters are sent through the data acquisition and processing equipment 30 and are input into the primary reader/interpreter 700 through the primary rendering server 424. The primary reader/interpreter 700 uses the parameters to scale the graphics data, so that it may be properly displayed and printed.

Continuing to refer to FIG. 9, the RWW module 360 first checks for the presence of the log format semaphore file 400 and then reads graphics data, with commands, from the primary sharable log format file 380 to the primary reader/interpreter 700. The primary reader/interpreter 700 also receives the parameters and uses the graphics data and the parameters to create object instructions, which it sends to the primary object builder 710. The primary object builder 710 turns the object instructions into a collection of objects, continuous or discrete, and sends the collection of objects to the primary object rendering module 720. A numerical value on a log is an example of a discrete object; the logging curves are continuous objects. The primary object rendering module 720 also receives commands from the primary reader/interpreter 700. Using the commands and the collection of objects, the primary object rendering module 720 creates a drawn object(s), or portions thereof, and sends it to the primary output module 730. The primary output module 730 uses the drawn object(s) to create graphics instructions, which it sends to the primary monitor 60 through the primary monitor device driver 85 and to the primary printer rasterization module 740. The primary printer rasterization module 740 turns the graphics instructions into rasters and sends them through the primary software switch 750 to one or more primary printer formatting modules 760. From there, the rasters go to the primary printer driver 80 and the primary printer 70.

III. File Transfer

Figure 6:
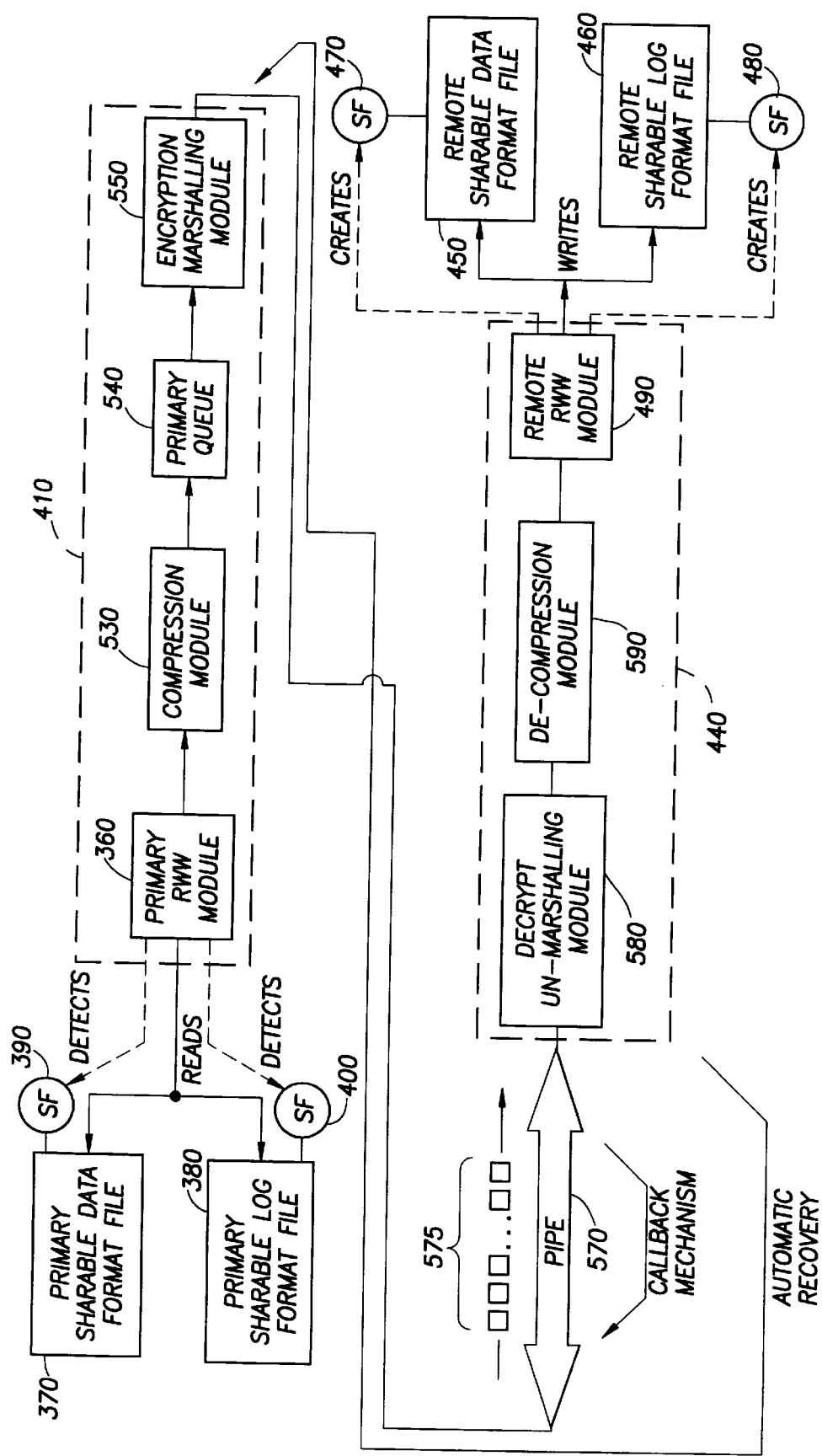
FIG. 6 illustrates the transmission process if near real time display is not desired.
Figure 7A:
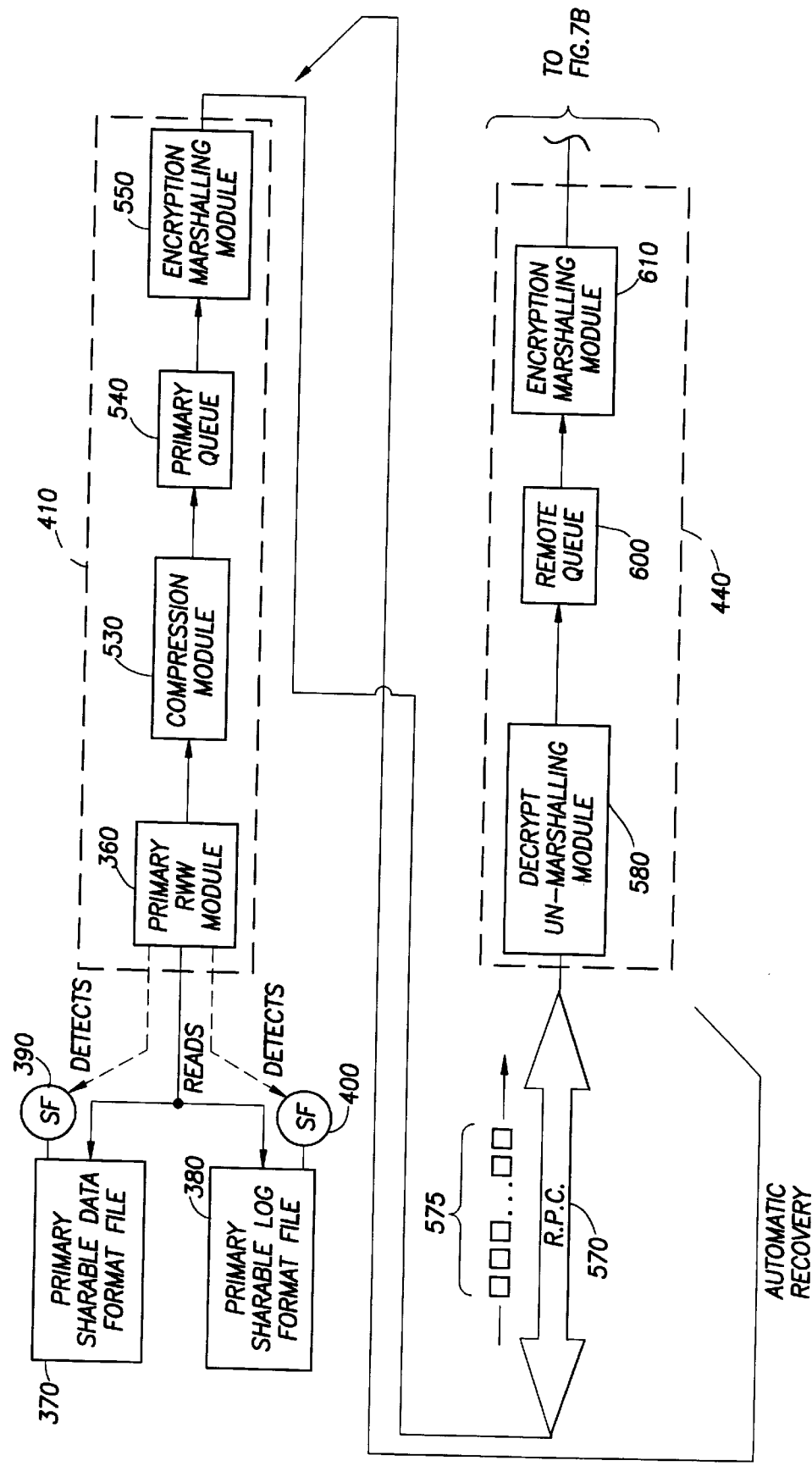
FIG. 7A and FIG. 7B illustrate the transmission process if near real time display is desired.
Figure 7B:
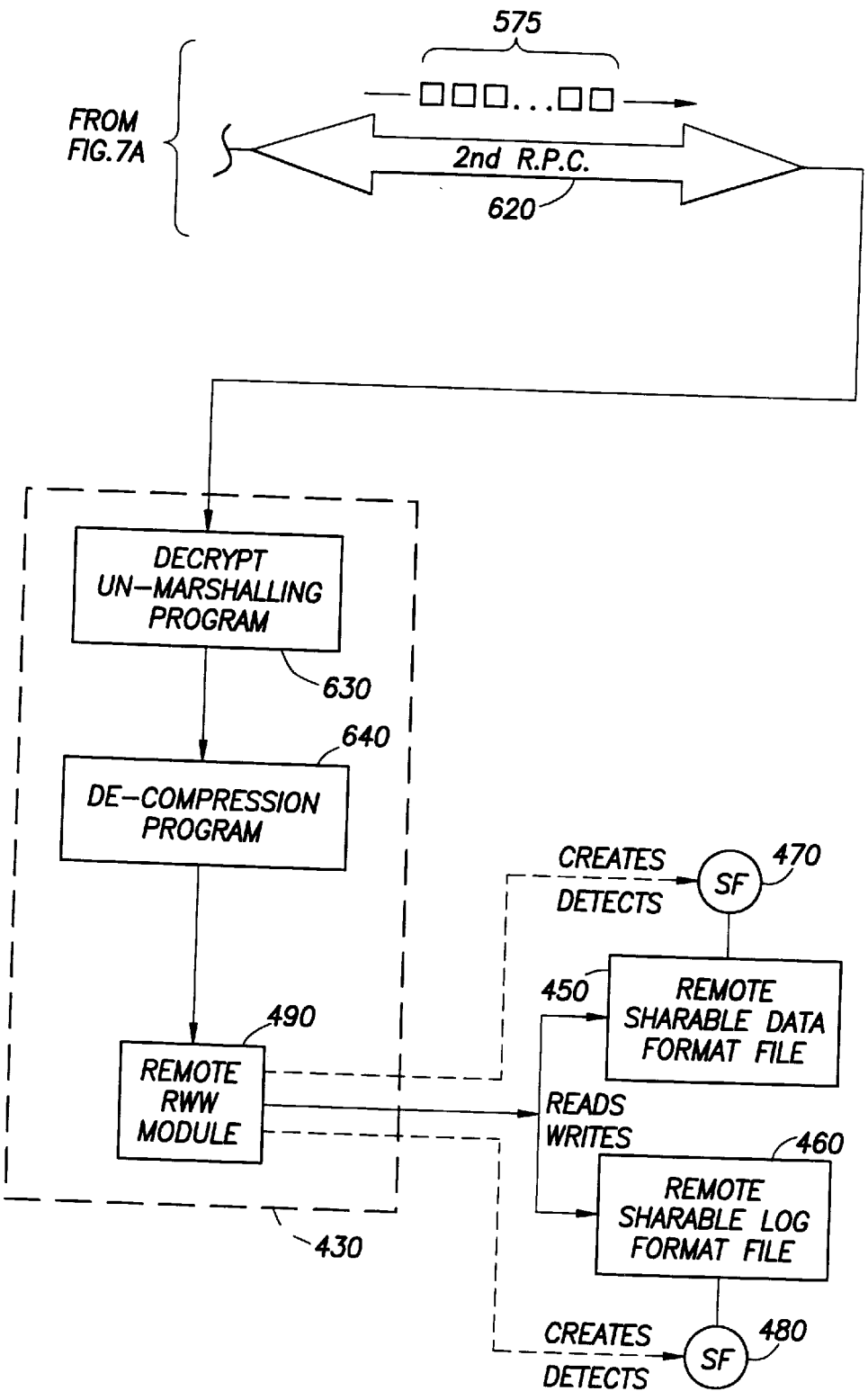

As the primary file transfer server 410 reads the data, it handles the data as described in co-pending U.S. patent application Ser. No. 08/772,712 and transmits the data over the communication system 110 to the remote location equipment. As illustrated in FIG. 6, FIG. 7A, and FIG. 7B, this includes reading the data while it is being written, compressing the data, queuing the data, encrypting the data, if desired, marshalling the data and transmitting the data. Encrypting and marshalling the data is accomplished preferably by DCE Software by the Open Group.

If there should be an interruption during transmission of the file, the remote file transfer client 440 attempts an automatic recovery. The remote file transfer client 440 will use an automatic callback system three times to attempt to re-establish communications. If communication is successfully re-established, the transfer of data will resume where it left off. This is accomplished by the remote file transfer client 440 knowing how many bytes of data it has and telling the primary file transfer server 410 to pick up at the next byte. If the remote file transfer client 440 has 1000 bytes of data, it will tell the primary file transfer server 410 to begin transmitting at byte number 1001. If the attempts are unsuccessful, i.e. the communications failure is complete, the transfer can be re-started manually, in recover mode, to resume from the point of interruption.

VI. At the Remote Location

At the remote location, the transmitted data is de-crypted, un-marshalled, decompressed and written to disk. This may be accomplished in many ways as detailed in the next section, but is preferably accomplished in one of two ways, depending on whether the data is to be viewed in near real time.

A. Without Near Real Time Viewing

If it is not desired to view the data in near real time, it is preferable to allow the remote file transfer client 440 to write data directly to the sharable data and log format files, instead of using the remote file transfer server to do so. In fact, in such a situation, a remote file transfer server is not required. In addition, in such a case, the remote procedure call preferredfor transmission is a DCE pipe. The pipe 570 includes a callback mechanism which provides for a continuous read-send loop. That is to say that the primary file transfer server 410 can send a first buffer via the remote procedure call 140 and then read a second buffer of data and send it too, without waiting for the remote file transfer client 440 to receive the first buffer and request another. Other remote procedure calls do not include the callback mechanism.

As illustrated in FIG. 6, in such a case, the transmitted data is received by the remote file transfer client 440, de-crypted and un-marshalled using a de-cryption/un-marshalling module 580. The de-cryption/un-marshalling module 580 is preferably DCE Software by the Open Group. The remote file transfer client 440 then decompresses the transmitted data with the decompression module 590 and uses its own copy of the RWW module 490 to write the data to the sharable remote data format file 450 and/or the sharable remote log format file 460 and create the semaphore files, 470, 480 for the sharable remote format files respectively. After the data storage is completed, the data may be rendered into a log and may be printed or viewed on the remote monitor.

B. With Near Real Time Viewing

If the data is to be viewed in near real time, it is preferable to allow the remote file transfer server to launch the remote renderer and remote monitor. In such a case, it is preferable that the remote file transfer server, and not the remote file transfer client, handle writing the data to the sharable data and log format files. In addition, in such a case, the remote procedure call need not be the DCE pipe, because in real time, the data is accumulating more slowly and may be transmitted at a slower rate. Because the data is coming more slowly, the callback mechanism provided by athe pipe is not as desirable. Also, the pipe may buffer the data, which is not preferable with near real time viewing. The remote procedure call is preferably a non-pipe remote procedure call provided by DCE Software.

As described in co-pending U.S. patent application Ser. No. 08/772,712 and as illustrated in FIG. 7A and FIG. 7B, the remote file transfer client 440 receives the transmitted data, decrypts and un-marshals it. The de-cryption/un-marshalling module 580 is preferably DCE Software by the Open Group. Then the remote file transfer client 440 encrypts and marshals the data, preferably again with the DCE Software by the Open Group, and uses a second remote procedure call to send the data to the remote file transfer server 430. The remote file transfer server 430 decrypts and un-marshals the data and decompresses it. The de-cryption/un-marshalling module 580 is again preferably DCE Software by the Open Group. Then using its own copy of the RWW module 490, the remote file transfer server 430 writes the data to the sharable remote data format file 450 and/or the sharable remote log format file 460, creating an associated semaphore file, 470, 480, respectively, for each.

If it is desired to view the data as it is being written, the remote rendering software can use its own copy of the RWW module 490 to read the graphics data from the sharable log format file 460 as it is being written and send the graphics data through appropriate device drivers to the printer or monitor. This allows a person at the remote location to view or to print the data while it is being written to the remote sharable graphics data format 460.

Figure 10:
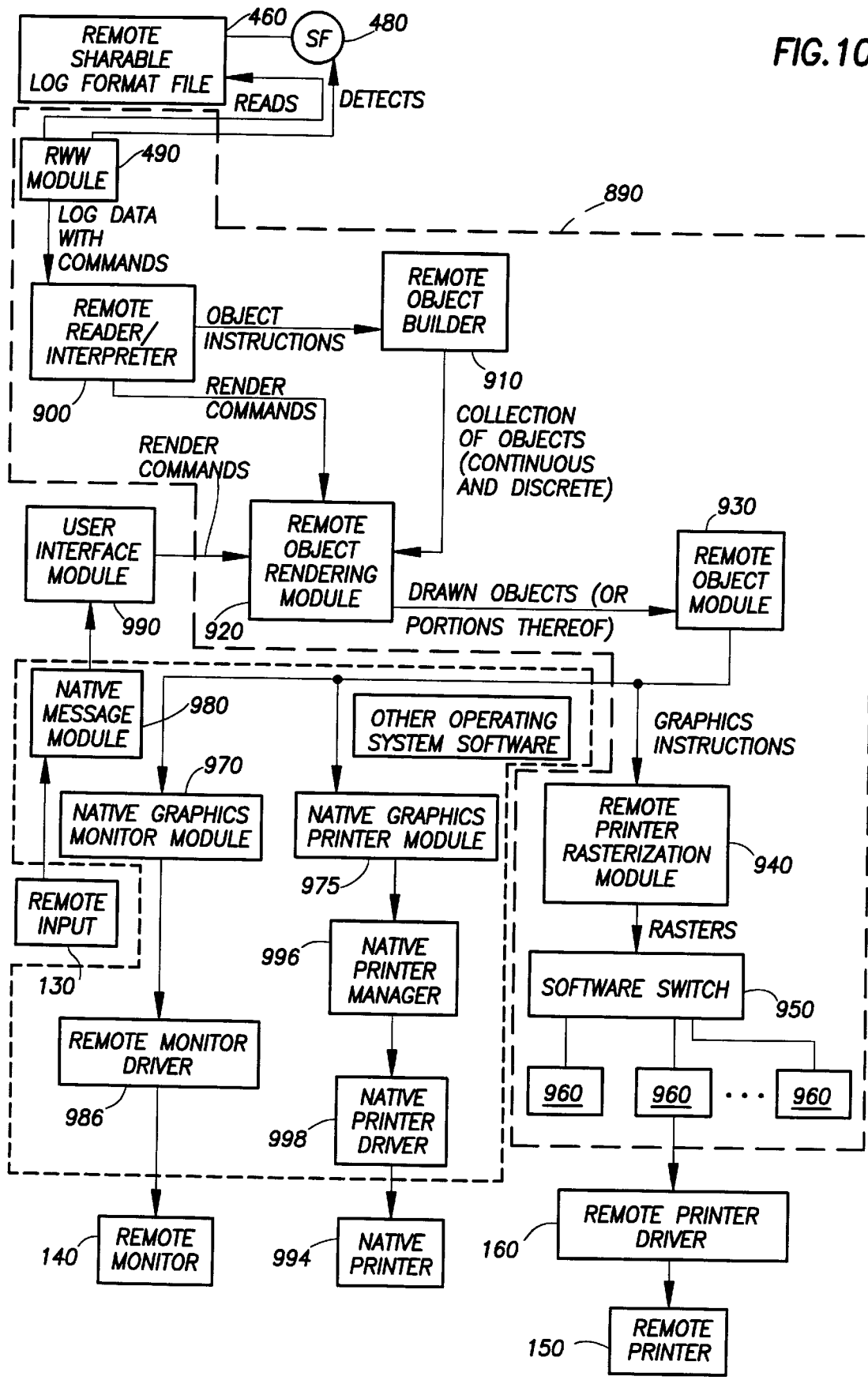
FIG. 10 illustrates the remote rendering software suite.

Referring to FIG. 5B and FIG. 10, a remote rendering software suite 890 may include a copy of the remote RWW module 490, a remote reader interpreter 900, a remote object builder 910, a remote object rendering module 920, a remote output module 930, a remote printer rasterization module 940, a remote software switch 950, and one or more primary printer formatting modules 960. The remote RWW module 490 first checks for the presence of the remote log format semaphore file 480 and then reads graphics data, with commands, from the remote sharable log format file 460 to the remote reader/interpreter 900. This can be done while data is being written to the remote sharable log format file 460. Preferably the remote RWW module 490 reads an incremental portion of the data, preferably 512 bytes or 1 kilobyte at a time, and sends it to the remote reader/interpreter 900.

Referring to FIG. 10, the remote reader/interpreter 900 uses the graphics data to create a plurality of object instructions. The remote reader/interpreter 900 sends the object instructions to the remote object builder 910. The remote object builder 910 turns the object instructions into a collection of objects, continuous or discrete, and sends the collection of objects to the remote object rendering module 920.

The remote object rendering module 920 also receives commands from the remote reader/interpreter 900. In addition, the remote object rendering module 920 receives input from the user. User input travels from the remote input 130 to a native message module 980, which is an event handler and preferably part of the Windows NT operating system. The native message module 980 directs the input signals to a user interface module 990. The user interface module 990 turns the signals into render commands and sends them to the remote object rendering module 920. The user interface module 990 responds to user requests (such as open file, print file, scroll, refresh, etc.) from the remote input 130 by sending signals to the remote reader interpreter 900 to prompt it to implement those requests.

Continuing to refer to FIG. 10, using the commands and the collection of objects it receives, the remote object rendering module 920 creates a drawn object(s), or portions thereof, and sends it to the remote output module 930. The remote output module 930 uses the drawn object(s) to create graphics instructions, which it sends to a native monitor graphics module 970, native printer graphics module 975 or the remote printer rasterization module 940.

Continuing to refer to FIG. 10, the remote printer rasterization module 940 turns the graphics instructions into rasters and sends them through the remote software switch 950 to one or more remote printer formatting modules 960. From there, the rasters go to the remote printer driver 160 and the remote printer 150.

Referring to FIG. 5B and FIG. 10, the native monitor graphics module 970 and the native printer graphics module 975 format the graphics instructions into native graphics protocol, preferably Windows protocol. The native graphics module 970 and the native printer graphics module 975 use the native graphics functions, preferably Windows, from the remote operating system to display the log on the remote monitor 140 through a remote monitor driver or print the log on a native printer 994, through a native print manager 996 and a native print driver 998.

After displaying the incremental portion of the log on a screen on the remote monitor, the native message module 980 and user interface module 990 respond to any possible user interface request, such as window re-drawing, log scrolling, display refresh, etc. Some of the user interface requests such as scrolling and screen refresh will result in calls to the remote object rendering module 920 to redraw areas of the log on the remote monitor 140. Once it has responded to any requests and if the user does not pause the log display or select the opening of a new file, the native message module 980 and user interface module 990 call the remote object rendering module 920 to prompt it to read the next portion of the log. The process is repeated until the end of the log file is reached.

The present invention also provides a method of person-to-person communication at the same time the log transmission is occurring. Using a conversations software system such as CoolTalk by InSoft Inc., distributed with Netscape Navigator™ 3.0 from Netscape Communications Corporation, and using the same communication system 110 over which the data is transmitted, person to person communication signals may be transmitted. One or more persons at the primary location such as a wellsite can hold a typed ("chat box"), verbal, video or electronic whiteboard communication with those viewing the log at the remote location. An electronic whiteboard provides an electronic board in the same electronic room as all the participants: all participants can write to the electronic board and the writings on the electronic board can be viewed by all participants simultaneously. Other communication software systems which can be used include WinTalk from ELF Communications which provides only chat and CU-SeeMe from White Pine Software, Inc. which provides video, audio, chat and whiteboard communication. The use of TCP/IP protocol allows the bandwidth of the communication system 110 to be shared by the file transfer and the communication signals.

A benefit of the present invention is that logging data can be transmitted from a wellsite to a remote location in near real time. The logs can be viewed almost simultaneously at the primary and remote locations.

Another benefit of the present invention is that it allows real time communication during the logging operation between persons at the remote location viewing the log and the logging engineer at the wellsite.

Another benefit of the present invention is that it allows secure transmission of the well data from the wellsite to the remote location.

Another benefit is reduced cost and increased safety by obviating the need to send additional personnel out to the wellsite for logging operations.

The principles, preferred embodiments, and modes of operation of the present invention have been described in the foregoing specification. The invention is not to be construed as limited to the particular forms disclosed, because these are regarded as illustrative rather than restrictive. Moreover, variations and changes may be made by those skilled in the art without departing from the spirit of the invention.

What is claimed is:

1. An apparatus for viewing a log in near real time at a primary location and a remote location comprising
   a) at the primary location, a first means for reading while writing the log to a first file;

b.) a first renderer at the primary location for reading the log as it is being written to the first file and rendering the log;

c.) a primary monitor for receiving signals from the first renderer and for viewing the rendered log at the primary location;

d.) a means for transmitting the log from the first file at the primary location as it is being written to the remote location over a communication means, the communication means having a physical link, a protocol and a transport mechanism;

e.) at the remote location, a second means for reading while writing, which writes the log as it is received from the primary location to a second file at the remote location;

f.) a second renderer at the remote location for reading the log as it is being written to the second file and rendering the log; and g.) a remote monitor for receiving signals from the second renderer and for viewing the rendered log at the remote location.

2. An apparatus for viewing logs in near real time at a primary location and a remote location comprising a.) a first format file at a primary location having data and a second format file at a secondary location;

b.) a means for reading while writing the data to the first format file and the second format file;

c.) a communications means including a physical link, a protocol and a transport mechanism; and d.) a first file transfer utility program and a second file transfer utility program, the first file transfer utility program for retrieving data from the first format file in near real time using the means for reading while writing and for transferring the data from the first format file to a second file transfer utility program over the communications means, the second file transfer utility program for writing the data in near real time to the second format file using the means for reading while writing.

3. An apparatus as in claim 2 further comprising:

e.) a first means at the primary location for obtaining the data from the format file and for rendering the log data into images for display on a first display means at the primary location; and f.) a second means at the primary location for obtaining the log data from the data format file and for rendering the log data into images for display on a second display means at the remote location.

4. A system for viewing logs in near real time at a primary location and a remote location comprising:

a.) a first means for reading while writing at the primary location;

b.) a second means for reading while writing at the remote location which is identical to the first means for reading while writing;

c.) a first file system at the primary location, the first file system having data written to it by the first means for reading while writing as numerical data or graphics data;

d.) a first rendering means for reading the graphics data from the first file system and rendering the graphics data so that it can be displayed;

e.) a first display means for displaying the rendered graphics data;

d.) a first file transfer utility means for transmitting the data from the primary location to the remote location over a communications system;

e.) a second file transfer utility means for receiving the data at the remote location;

f.) a second file system at the remote location, to which the second file transfer utility means writes the received data using the second means for reading while writing;

g.) a second rendering means for reading graphics data from the second file system and rendering the graphics data so that it can be displayed;

h.) a input interface means which directs signals from an user input to the second rendering means to adjust the display of the log; and i.) a second display means for displaying the rendered graphics data at the remote location.

5. A system for viewing logs in near real time at a primary location and a remote location as in claim 4 wherein the first means for reading while writing is a read while write module.

6. A system for viewing logs in near real time at a primary location and a remote location as in claim 5 wherein the second means for reading while writing is a read while write module identical to the first read while write module.

7. A system for viewing logs in near real time at a primary location and a remote location as in claim 4 wherein the first file system includes a first format file.

8. A system for viewing logs in near real time at a primary location and a remote location as in claim 4 wherein the first file system includes a first data format file and a first log format file.

9. A system for viewing logs in near real time at a primary location and a remote location as in claim 4 wherein the first rendering means includes a first rendering software, a rendering server and a third means for reading while writing identical to the first means for reading while writing.

10. A system for viewing logs in near real time at a primary location and a remote location as in claim 4 wherein the first display means includes a first monitor.

11. A system for viewing logs in near real time at a primary location and a remote location as in claim 4 wherein the first display means includes a first printer.

12. A system for viewing logs in near real time at a primary location and a remote location as in claim 4, wherein the first file transfer utility means includes a first file transfer server.

13. A system for viewing logs in near real time at a primary location and a remote location as in claim 4 wherein the first file transfer utility means includes a first file transfer client.

14. A system for viewing logs in near real time at a primary location and a remote location as in claim 12 wherein the first file transfer server includes a copy of the first means for reading while writing.

15. A system for viewing logs in near real time at a primary location and a remote location as in claim 12 wherein the first file transfer client includes a copy of the first means for reading while writing.

16. A system for viewing logs in near real time at a primary location and a remote location as in claim 4 wherein the first rendering software includes a first reader/interpreter means, a first object builder, a first object rendering module, and a first output module.

17. A system for viewing logs in near real time at a primary location and a remote location as in claim 16, wherein the first reader/interpreter means includes a first reader/interpreter.

18. A system for viewing logs in near real time at a primary location and a remote location as in claim 16, wherein the first reader/interpreter means includes a first reader and a first interpreter.

19. A system for viewing logs in near real time at a primary location and a remote location as in claim 4, wherein the second file transfer utility means includes a second file transfer server.

20. A system for viewing logs in near real time at a primary location and a remote location as in claim 4 wherein the second file transfer utility means includes a second file transfer client.

21. A system for viewing logs in near real time at a primary location and a remote location as in claim 4 or 7, wherein the second file system includes a second format file.

22. A system for viewing logs in near real time at a primary location and a remote location as in claim 4 or 8, wherein the second file system includes a second data format file and a second log format file.

23. A system for viewing logs in near real time at a primary location and a remote location as in claim 4, wherein the second rendering means includes a second rendering software, and a fourth means for reading while writing identical to the first means for reading while writing.

24. A system for viewing logs in near real time at a primary location and a remote location as in claim 23, wherein the second rendering software includes a second reader/interpreter means, a second object builder, a second object rendering module, and a second object module.

25. A system for viewing logs in near real time at a primary location and a remote location as in claim 23, wherein the second reader/interpreter means comprises a reader/interpreter.

26. A system for viewing logs in near real time at a primary location and a remote location as in claim 23, wherein the second reader/interpreter means comprises a reader and an interpreter.

27. A system for viewing logs in near real time at a primary location and a remote location as in claim 4, wherein the input interface means includes an input, a message handler module and an user interface module.

28. A system for viewing logs in near real time at a primary location and a remote location as in claim 4 wherein the second display means includes a second monitor.

29. A system for viewing logs in near real time at a primary location and a remote location as in claim 4 wherein the second display means includes a second printer.

30. A system for viewing logs in near real time at a primary location and a remote location as in claim 4 wherein the second display means includes a native printer.

31. A system for viewing logs in near real time at a primary location and a remote location as in claim 4, wherein the communication system includes a physical link, a protocol and a transport mechanism.

32. A system for viewing logs in near real time at a primary location and a remote location as in claim 31, wherein the protocol is TCP/IP.

33. A system for viewing logs in near real time at a primary location and a remote location as in claim 31, wherein the physical link comprises satellite communication.

34. A system for viewing logs in near real time at a primary location and a remote location as in claim 31, wherein the physical link comprises telephone communication.

35. A system for viewing logs in near real time at a primary location and a remote location as in claim 31, wherein the physical link comprises communication via microwave transmission.

36. A system for viewing logs in near real time at a primary location and a remote location as in claim 31, wherein the physical link comprises radio communication.

37. A system for viewing logs in near real time at a primary location and a remote location as in claim 31, wherein the physical link comprises cellular communication.

38. A system for viewing logs in near real time at a primary location and a remote location as in claim 31, wherein the physical link comprises communication via modem.

39. A system for viewing logs in near real time at a primary location and a remote location as in claim 4, wherein the communication system also allows for person to person communication between the primary location and the remote location.

40. A system for viewing logs in near real time at a primary location and a remote location as in claim 39, wherein the personal communication comprises typed (chat box) communication.

41. A system for viewing logs in near real time at a primary location and a remote location as in claim 39, wherein the personal communication comprises audio communication.

42. A system for viewing logs in near real time at a primary location and a remote location as in claim 39, wherein the personal communication comprises video communication.

43. A system for viewing logs in near real time at a primary location and a remote location as in claim 39, wherein the personal communication comprises electronic whiteboard communication.

44. A system for viewing logs in near real time at a primary location and a remote location as in claim 4 wherein the primary location is a wellsite and further comprising:
   a data acquisition system for acquiring data from logging tools and sending it to the first means for reading while writing for storage onto the first file system.

45. A system for viewing logs in near real time at a primary location and a remote location comprising:
   a.) a first read while write module at the primary location;
   b.) a second read while write module at the remote location which is identical to the first read while write module;
   c.) a first data format file at the primary location having numerical data written to it by the first read while write module;
   d) a first log format file at the primary location having graphical data written to it by the first read while write module;
   e.) a first rendering software suite for reading the graphics data from the first log format file and rendering the graphics data so that it can be displayed;
   f.) a first monitor means for displaying the rendered graphics data at the primary location;
   g.) a first printer means for displaying the rendered graphics data at the primary location;
   h.) a first file transfer utility means for transmitting the data from the primary location to the remote location over a communications system, the communication system including a physical link, a protocol and a transport mechanism;
   i.) a second file transfer utility means for receiving the data at the remote location;

j.) a second data format file at the remote location to which the second file transfer utility means writes the received numerical data using the second means for reading while writing;

k.) a second log format file at the remote location to which the second file transfer utility means writes the received graphical data using the second means for reading while writing;

l.) a second rendering software suite for reading graphics data from the second log format file and rendering the graphics data so that it can be displayed;

m.) a input interface means which directs signals from an user input to the second rendering means to adjust the display of the log; and i.) a second display means for displaying the rendered graphics data at the remote location.

46. A system for viewing logs in near real time at a primary location and a remote location as in claim 45 wherein the first rendering software suite includes a first rendering software, a rendering server and a third read while write module identical to the first read while write module.

47. A system for viewing logs in near real time at a primary location and a remote location as in claim 45 wherein the first monitor means includes a first monitor.

48. A system for viewing logs in near real time at a primary location and a remote location as in claim 45 wherein the first printer means includes a first printer.

49. A system for viewing logs in near real time at a primary location and a remote location as in claim 45, wherein the first file transfer utility means includes a first file transfer server.

50. A system for viewing logs in near real time at a primary location and a remote location as in claim 45, wherein the first file transfer utility means includes a first file transfer client.

51. A system for viewing logs in near real time at a primary location and a remote location as in claim 49, wherein the first file transfer server includes a copy of the first means for reading while writing.

52. A system for viewing logs in near real time at a primary location and a remote location as in claim 50, wherein the first file transfer client includes a copy of the first means for reading while writing.

53. A system for viewing logs in near real time at a primary location and a remote location as in claim 46, wherein the first rendering software includes a first reader/interpreter means, a first object builder, a first object rendering module, and a first output module.

54. A system for viewing logs in near real time at a primary location and a remote location as in claim 53, wherein the first reader/interpreter means includes a first reader/interpreter.

55. A system for viewing logs in near real time at a primary location and a remote location as in claim 53, wherein the first reader/interpreter means includes a first reader and a first interpreter.

56. A system for viewing logs in near real time at a primary location and a remote location as in claim 45, wherein the second file transfer utility means includes a second file transfer server.

57. A system for viewing logs in near real time at a primary location and a remote location as in claim 45, wherein the second file transfer utility means includes a second file transfer client.

58. A system for viewing logs in near real time at a primary location and a remote location as in claim 45, wherein the second rendering means includes a second rendering software, and a fourth means for reading while writing identical to the first means for reading while writing.

59. A system for viewing logs in near real time at a primary location and a remote location as in claim 58, wherein the second rendering software includes a second reader/interpreter means, a second object builder, a second object rendering module, and a second object module.

60. A system for viewing logs in near real time at a primary location and a remote location as in claim 59, wherein the second reader/interpreter means comprises a reader/interpreter.

61. A system for viewing logs in near real time at a primary location and a remote location as in claim 59, wherein the second reader/interpreter means comprises a reader and an interpreter.

62. A system for viewing logs in near real time at a primary location and a remote location as in claim 45, wherein the input interface means includes an input, a message handler module and an user interface module.

63. A system for viewing logs in near real time at a primary location and a remote location as in claim 45, wherein the second display means includes a second monitor.

64. A system for viewing logs in near real time at a primary location and a remote location as in claim 45, wherein the second display means includes a second printer.

65. A system for viewing logs in near real time at a primary location and a remote location as in claim 45, wherein the second display means includes a native printer.

66. A system for viewing logs in near real time at a primary location and a remote location as in claim 45, wherein the protocol is TCP/IP.

67. A system for viewing logs in near real time at a primary location and a remote location as in claim 66, wherein the physical link comprises satellite communication.

68. A system for viewing logs in near real time at a primary location and a remote location as in claim 66, wherein the physical link comprises telephone communication.

69. A system for viewing logs in near real time at a primary location and a remote location as in claim 66, wherein the physical link comprises communication via microwave transmission.

70. A system for viewing logs in near real time at a primary location and a remote location as in claim 66, wherein the physical link comprises radio communication.

71. A system for viewing logs in near real time at a primary location and a remote location as in claim 66, wherein the physical link comprises cellular communication.

72. A system for viewing logs in near real time at a primary location and a remote location as in claim 66, wherein the physical link comprises communication via modem.

73. A system for viewing logs in near real time at a primary location and a remote location as in claim 45, wherein the communication system also allows for person to person communication between the primary location and the remote location.

74. A system for viewing logs in near real time at a primary location and a remote location as in claim 73, wherein the personal communication comprises typed (chat box) communication.

75. A system for viewing logs in near real time at a primary location and a remote location as in claim 73, wherein the personal communication comprises audio communication.

76. A system for viewing logs in near real time at a primary location and a remote location as in claim 73, wherein the personal communication comprises video communication.

77. A system for viewing logs in near real time at a primary location and a remote location as in claim 73, wherein the personal communication comprises electronic whiteboard communication.

78. A system for viewing logs in near real time at a primary location and a remote location as in claim 45, wherein the primary location is a wellsite and further comprising:
   a data acquisition system for acquiring data from logging tools and sending it to the first means for reading while writing for storage onto the first data format file and the first log format file.

79. A method for viewing a log in near real time at a primary location and a remote location comprising the steps of:
   a.) writing data including numerical data and graphics data to a first file system at the primary location;
   b.) reading the data from the first file system while writing it;
   c.) rendering the graphics data so that it can be displayed at the primary location;
   d.) displaying the graphics data at the primary location;
   e.) reading the data while it is being written and transferring the data from the primary location to the remote location over a communication system, the communication system including a physical link, a protocol and a transport mechanism;
   f.) receiving the data at the remote location;
   g.) writing the data as it is being received to a second file system at the remote location;
   h.) reading the data from the second file system while writing it;
   c.) rendering the graphics data from the second file system so that it can be displayed at the remote location; and
   d.) displaying the graphics data at the remote location.

80. A method for viewing a log in near real time at a primary location and a remote location as in claim 79, further comprising the step of:
   adjusting the display of the log at the second location responsive to user input.

81. A method for viewing a log in near real time at a primary location and a remote location as in claim 79, wherein the log is displayed at the remote location on a remote monitor.

82. A method for viewing a log in near real time at a primary location and a remote location as in claim 79, wherein the log is displayed at the remote location on a remote printer.

83. A method for viewing a log in near real time at a primary location and a remote location as in claim 79, wherein the log is displayed at the remote location on a native printer.

84. A method for viewing logs in near real time at a primary location and a remote location as in claim 79, wherein the protocol is TCP/IP.

85. A method for viewing logs in near real time at a primary location and a remote location as in claim 84, wherein the physical link comprises satellite communication.

86. A method for viewing logs in near real time at a primary location and a remote location as in claim 84, wherein the physical link comprises telephone communication.

87. A method for viewing logs in near real time at a primary location and a remote location as in claim 84, wherein the physical link comprises communication via microwave transmission.

88. A method for viewing logs in near real time at a primary location and a remote location as in claim 84, wherein the physical link comprises radio communication.

89. A method for viewing logs in near real time at a primary location and a remote location as in claim 84, wherein the physical link comprises cellular communication.

90. A method for viewing logs in near real time at a primary location and a remote location as in claim 84, wherein the physical link comprises communication via modem.

91. A method for viewing logs in near real time at a primary location and a remote location as in claim 79, wherein the communication system also allows for person to person communication between the primary location and the remote location.

92. A method for viewing logs in near real time at a primary location and a remote location as in claim 79, wherein the personal communication comprises typed (chat box) communication.

93. A method for viewing logs in near real time at a primary location and a remote location as in claim 79, wherein the personal communication comprises audio communication.

94. A method for viewing logs in near real time at a primary location and a remote location as in claim 79, wherein the personal communication comprises video communication.

95. A method for viewing logs in near real time at a primary location and a remote location as in claim 79, wherein the personal communication comprises electronic whiteboard communication.

96. An apparatus for sharing a data file between a primary location and a remote location comprising:
   a.) a first means for reading while writing at the primary location;
   b.) a second means for reading while writing at the remote location which is identical to the first means while writing;
   c.) a first file system at the primary location, the first file system having data written to it by the first means for reading while writing as either numerical data or graphics data;
   d.) a first rendering means for reading the graphics data from the first file system and rendering the graphics data so that it can be displayed at the primary location;
   e.) a first display means for displaying the rendered graphics data at the primary location;
   f.) a first file transfer utility means for transmitting the data from the primary location to the remote location over a communications system, the communication system including a physical link, a protocol and a transport mechanism;
   g.) a second file transfer utility means for receiving the data at the remote location;
   h.) a second file system at the remote location, to which the second file transfer utility means writes the received data using the second means for reading while writing;
   i.) a second rendering means for reading graphics data from the second file system and rendering the graphics data so that it can be displayed at the remote location;
   j.) a input interface means which directs signals from user input to the second rendering means to adjust the display of the log; and k.) a second display means for displaying the rendered graphics data at the remote location.

97. An apparatus for viewing logs in near real time at a primary location, a first remote location and one or more supplementary remote location comprising:
 a.) a first read while write module at the primary location;
 b.) a second read while write module at the first remote location which is identical to the first read while write module;
 c.) a first data format file at the primary location having numerical data written to it by the first read while write module;
 d) a first log format file at the primary location having graphical data written to it by the first read while write module;
 e.) a first rendering software suite for reading the graphics data from the first log format file and rendering the graphics data so that it can be displayed;
 f.) a first monitor means for displaying the rendered graphics data at the primary location;
 g.) a first printer means for displaying the rendered graphics data at the primary location;
 h.) a first file transfer server for transmitting the data from the primary location to the first remote location over a communication system, the communication system including a physical link, a protocol and transport mechanism;
 i.) a first file transfer client for receiving the data at the first remote location and sending it to a secondary file transfer server the supplementary remote location;
 j.) a second data format file at the remote location which the first file transfer client writes the received numerical data using the second means for reading while writing;
 k.) a second log format file at the remote location to which the first file transfer client writes the received graphical data using the second means for reading while writing;
 l.) a second rendering software suite for reading graphics data from the second log format file and rendering the graphics data so that it can be displayed;
 m.) a input interface means which directs signals from an user input to the second rendering means to adjust the display of the log the first remote location;
 n.) a second display means for displaying the rendered graphics data at the first remote location;
 o.) a tertiary data format file at the supplemental remote location to which the secondary file transfer server writes the received numerical data using a tertiary means for reading while writing, the tertiary means for reading while writing being identical to the first means for reading while writing;
 p.) a tertiary log format file at the remote location to which the secondary file transfer server writes the received graphical data using the tertiary means for reading while writing;
 q.) a tertiary rendering software suite for reading graphics data from the tertiary log format file and rendering the graphics data so that it can be displayed at the supplemental remote location;
 r.) a second input interface means which directs signals from an second user input to the tertiary rendering means to adjust he display of the log at the supplemental remote location; and
 s.) a tertiary display means for displaying the rendered graphics data at the supplemental remote location.

98. A system including primary location apparatus adapted for generating a log at a primary location and allowing the viewing of said log at said primary location in near real time, said primary location apparatus comprising:
 a first apparatus adapted for receiving a set of log data and modifying said log data thereby generating modified log data which represents said log;
 a first file; and
 a first read while write apparatus operatively interconnected between said first apparatus and said first file, said first read while write apparatus being adapted for reading said modified log data from said first apparatus while writing said modified log data to said first file.

99. The system of claim 98, wherein said primary location apparatus further comprises:
 a second read while write apparatus operatively connected to said first file; and
 a first renderer operatively connected to said second read while write apparatus,
 said second read while write apparatus adapted for reading said modified log data from said first file while writing said modified log data to said first renderer,
 said first renderer rendering said modified log data thereby allowing said modified log data to be displayed.

100. The system of claim 99, wherein said primary location apparatus further comprises:
 a primary monitor operatively connected to said first renderer adapted for receiving signals from said first renderer indicative of a rendered modified log data and for viewing the rendered modified log at said primary location.

101. The system of claim 98, wherein said primary location apparatus further comprises:
 a semaphore file associated with said first file indicating that said first file is sharable;
 a second read while write apparatus operatively connected to said first file and to said semaphore file; and
 a first renderer operatively connected to said second read while write apparatus,
 said second read while write apparatus adapted for reading said modified log data from said first file when said second read while write apparatus detects the existence of said semaphore file associated with said first file while writing said modified log data to said first renderer,
 said first renderer rendering said modified log data.

102. The system of claim 101, wherein said primary location apparatus further comprises:
 a primary monitor operatively connected to said first renderer for receiving signals from said first renderer indicative of a rendered modified log data and for viewing the rendered modified log at said primary location.

103. The system of claim 98 wherein said system further includes a remote location apparatus adapted for allowing the viewing of said log at a remote location in near real time approximately simultaneously with the generation of said log at said primary location, and a communication link operatively interposed and interconnected between said first file of said primary location apparatus and said remote location apparatus for communicating said modified log data from said first file of said primary location apparatus to said remote location apparatus.

104. The system of claim 103, wherein said primary location apparatus comprises a semaphore file associated with said first file indicating said first file is sharable, and wherein said communication link communicates said modified log data from said first file of said primary location apparatus to said remote location apparatus when said semaphore file is associated with said first file.

105. The system of claim 103, wherein said communication link includes a primary file transfer utility apparatus operatively connected to said first file and adapted to receive said modified log data from said first file, a remote file transfer utility apparatus, and a communication medium interposed and operatively interconnected between said primary file transfer utility apparatus and said remote file transfer utility apparatus adapted for communicating said modified log data from said primary file transfer utility apparatus to said remote file transfer utility apparatus, and wherein said remote location apparatus comprises:

a second file operatively connected to said remote file transfer utility apparatus and adapted to receive said modified log data from said remote file transfer utility apparatus; and a further read while write apparatus operatively connected to said second file.

106. The system of claim 105, further comprising a further semaphore file associated with said second file, and wherein said remote location apparatus further comprises:

a second renderer operatively connected to said further read while write apparatus, said further read while write apparatus adapted for reading said modified log data from said second file when said further semaphore file is associated with said second file while writing said modified log data to said second renderer, said second renderer rendering said modified log data thereby allowing said modified log data at said remote location to be displayed.

107. The system of claim 106, wherein said remote location apparatus further comprises:

a remote monitor operatively connected to said second renderer for receiving signals from said second renderer indicative of a rendered modified log data and for viewing the rendered modified log at said remote location.

108. The system of claim 102, wherein said system further includes a remote location apparatus adapted for allowing the viewing of said log at a remote location in near real time approximately simultaneously with the generation of said log at said primary location, and a communication link operatively interposed and interconnected between said first file of said primary location apparatus and said remote location apparatus for communicating said modified log data from said first file of said primary location apparatus to said remote location apparatus.

109. The system of claim 108, wherein said primary location apparatus comprises a semaphore file associated with said first file indicating said first file is sharable, and wherein said communication link communicates said modified log data from said first file of said primary location apparatus to said remote location apparatus when said semaphore file is associated with said first file.

110. The system of claim 108, wherein said communication link includes a primary file transfer utility apparatus operatively connected to said first file and adapted to receive said modified log data from said first file, a remote file transfer utility apparatus, and a communication medium interposed and operatively interconnected between said primary file transfer utility apparatus and said remote file transfer utility apparatus adapted for communicating said modified log data from said primary file transfer utility apparatus to said remote file transfer utility apparatus, and wherein said remote location apparatus comprises:

a second file operatively connected to said remote file transfer utility apparatus and adapted to receive said modified log data from said remote file transfer utility apparatus; and a further read while write apparatus operatively connected to said second file.

111. The system of claim 110, further comprising a further semaphore file associated with said second file, and wherein said remote location apparatus further comprises:

a second renderer operatively connected to said further read while write apparatus, said further read while write apparatus adapted for reading said modified log data from said second file when said further semaphore file is associated with said second file while writing said modified log data to said second renderer, said second renderer rendering said modified log data thereby allowing said modified log data to be displayed.

112. The system of claim 111, wherein said remote location apparatus further comprises:

a remote monitor operatively connected to said second renderer adapted for receiving signals from said second renderer indicative of a rendered modified log data and for viewing the rendered modified log at said remote location.

113. A method of displaying or printing acquired well data in near real time at a location relative to the acquisition of said well data, comprising the steps of:

(a) generating a set of log data by a first apparatus at said location in response to said acquired well data;

(b) reading by a first read while write apparatus at said location said set of log data from said first apparatus while writing said set of log data to a first file;

(c) displaying or printing said set of log data in said first file at said location.

114. The method of claim 113, wherein the displaying or printing step (c) comprises the steps of:

(c1) reading by a second read while write apparatus said set of log data from said first file while writing said set of log data to a first renderer apparatus; and (c2) displaying by said first renderer apparatus said set of log data on a display or printing said set of log data on a printer in near real time relative to the acquisition of said acquired well data.

115. The method of claim 114, wherein the displaying or printing step (c) further comprises the steps of:

(c3) reading said set of log data in said first file; and (c4) transmitting said set of log data read during the reading step (c3) from said location to another said location.

116. The method of claim 115, wherein the displaying or printing step (c) further comprises the steps of:

(c5) receiving at said another said location said set of log data and writing said set of log data in a second file;

(c6) reading by a further read while write apparatus said set of log data from said second file while writing said set of log data to a further renderer apparatus; and (c7) displaying by said further renderer apparatus said set of log data on a display or printing said set of log data on a printer in near real time relative to the acquisition of said acquired well data.

117. The method of claim 113, wherein the displaying or printing step (c) comprises the steps of:
   (c1) reading said set of log data in said first file; and
   (c2) transmitting said set of log data read during the reading step (c1) from said location to another said location.

118. The method of claim 117, wherein the displaying or printing step (c) further comprises the steps of:
   (c3) receiving at said another said location said set of log data and writing said set of log data in a second file;
   (c4) reading by a further read while write apparatus said set of log data from said second file while writing said set of log data to a further renderer apparatus; and
   (c5) displaying by said further renderer apparatus said set of log data on a display or printing said set of log data on a printer in near real time relative to the acquisition of said acquired well data.

119. The method of claim 114, wherein the reading step (c1) comprises the steps of:
   (c11) determining if a semaphore file is associated with said first file; and
   (c12) reading by said second read while write apparatus said set of log data from said first file when said semaphore file is associated with said first file while writing said set of log data to a first renderer apparatus.

120. The method of claim 116, wherein the reading step (c6) comprises the steps of:
   (c61) determining if a semaphore file is associated with said second file; and
   (c62) reading by said further read while write apparatus said set of log data from said second file when said semaphore file is associated with said second file while writing said set of log data to said further renderer apparatus.

121. The method of claim 118, wherein the reading step (c4) comprises the steps of:
   (c41) determining if a semaphore file is associated with said second file; and
   (c42) reading by said further read while write apparatus said set of log data from said second file when said semaphore file is associated with said second file while writing said set of log data to said further renderer apparatus.

* * * * *

UNITED STATES PATENT AND TRADEMARK OFFICE
CERTIFICATE OF CORRECTION

PATENT NO. : 5,864,772
DATED : January 26, 1999
INVENTOR(S) : Juan C. Alvarado, et. al.

It is certified that error appears in the above-identified patent and that said Letters Patent is hereby corrected as shown below:

Claim 45, page 7 of the claims, line 30: change "i.)" to --n.)--;

Claim 79, page 11 of the claims, line 20: change "c.)" to --i.)--, and
line 22: change "d.)" to --j.)--; and Claim 113, line 8 after "first file;" insert --and--.

Signed and Sealed this

Fourteenth Day of December, 1999

Attest:

Q. TODD DICKINSON

Attesting Officer

Acting Commissioner of Patents and Trademarks